(12) United States Patent  (10) Patent No.: US 7,491,468 B2
Okada et al.  (45) Date of Patent: Feb. 17, 2009

(54) METHOD FOR PREPARING POSITIVE ELECTRODE MATERIAL FOR SECONDARY CELL, AND SECONDARY CELL

(75) Inventors: Shigeto Okada, Fukuoka (JP); Jun-ichi Yamaki, Kasuga (JP); Naoki Hatta, Ichihara (JP); Izumi Uchiyama, Ichihara (JP); Toshikazu Inaba, Ichihara (JP)

(73) Assignees: Japan as represented by the President of the University of Kyusyu, Higashi-Ku, Fukoka-shi (JP); Mitsui Engineering & Shipbuilding Co., Ltd. et al., Tokyo (JP)

( * ) Notice: Subject to any disclaimer, the term of this patent is extended or adjusted under 35 U.S.C. 154(b) by 413 days.

(21) Appl. No.: 10/531,196

(22) PCT Filed: Oct. 17, 2003

(86) PCT No.: PCT/JP03/13314

§ 371 (c)(1),
(2), (4) Date: Dec. 12, 2005

(87) PCT Pub. No.: WO2004/036671

PCT Pub. Date: Apr. 29, 2004

(65) Prior Publication Data
US 2006/0147365 A1 Jul. 6, 2006

(30) Foreign Application Priority Data
Oct. 18, 2002 (JP) ............................. 2002-303931

(51) Int. Cl.
*H01M 4/00* (2006.01)
*H01M 4/58* (2006.01)
*C01B 15/16* (2006.01)

(52) U.S. Cl. .................... 429/221; 429/231.95; 423/306
(58) Field of Classification Search ................. 429/221, 429/231.95; 423/306
See application file for complete search history.

(56) References Cited

U.S. PATENT DOCUMENTS

| 4,740,437 | A | * | 4/1988 | Fujii et al. | .................. 429/213 |
| 5,888,671 | A | * | 3/1999 | Yamasaki et al. | ........... 429/232 |
| 6,514,640 | B1 | * | 2/2003 | Armand et al. | .......... 429/231.1 |
| 6,585,915 | B2 | * | 7/2003 | Shinozaki et al. | ........... 252/502 |

FOREIGN PATENT DOCUMENTS

CA  2456056 A1 * 2/2003
WO  WO0227823  * 4/2002

* cited by examiner

*Primary Examiner*—Patrick Ryan
*Assistant Examiner*—Muhammad Siddiquee
(74) *Attorney, Agent, or Firm*—Priest & Goldstein, PLLC

(57) ABSTRACT

A method for producing a cathode material for a secondary battery, characterized in that it comprises admixing a compound liberating a phosphate ion in a solution (phosphoric acid $H_3PO_4$, phosphorus pentoxide $PO_5$, ammonium dihydrogenphosphate $NH_4H_2PO_4$ and the like), water and metallic iron, adding lithium carbonate, lithium hydroxide or a hydrate thereof to the resultant mixture, and firing the resultant reaction product, to thereby synthesize $LiFePO_4$.

8 Claims, 14 Drawing Sheets

METHOD FOR PREPARING POSITIVE ELECTRODE MATERIAL FOR SECONDARY CELL, AND SECONDARY CELL

TECHNICAL FIELD

The present invention relates to a method for producing a cathode material for a secondary battery and a secondary battery using the cathode material. More specifically, the present invention relates to a method for producing a cathode material $LiFePO_4$ for a secondary battery using lithium or a compound thereof as an active material such as a metal lithium battery, lithium ion battery and lithium polymer battery, and to a secondary battery using the cathode material produced by the method.

BACKGROUND ART $LiFePO_4$ having an olivine-type (Pnma) crystal structure as a cathode material used in a secondary battery such as a metal lithium battery, lithium ion battery, or lithium polymer battery is subjected to electrode oxidation/reduction accompanied by doping/undoping of lithium during the process of charging and discharging. Such secondary batteries are attracting attention as large capacity batteries in recent years.

Conventionally, the following methods have been suggested as methods for synthesizing the cathode material $LiFePO_4$; (1) A method comprising the steps of mixing ferrous phosphate octahydrate $[Fe_3(PO_4)_2 \cdot 8H_2O]$, ammonium hydrogenphosphate $[(NH_4)_2HPO_4]$, and lithium carbonate $(LiCO_3)$ at a specific ratio and calcining the mixture (JP-A-Hei 9-171827, for example); (2) A method comprising the step of mixing iron oxalate $(FeC_2O_4)$ as an iron source with ammonium hydrogenphosphate $(NH_4H_2PO_4)$ and lithium carbonate $(LiCO_3)$ at a specific ratio (JP-A 2000-294238); (3) A method comprising the steps of adding a carbon material to a mixture of $Fe_3(PO_4)_2 \cdot 8H_2O$ and $Li_3PO_4$, and calcining the mixture in an atmosphere containing 1012 ppm or less (by volume) of oxygen (JP-A 2002-110163, for example).

Also, (4) a method comprising the steps of mixing $Fe_3(PO_4)_2 \cdot 8H_2O$ and $Li_3PO_4$ as ingredients with an organic material (polymer, monomer, low-molecule weight compound, etc.) which is turned into carbon deposits by pyrolysis, and calcining the mixture to cause pyrolysis of the organic material (JP-A 2001-15111) has been suggested.

However, the starting materials used in the above methods (1) to (3) are all secondary compounds which are expensive and difficult to obtain. For example, $Li_3PO_4$ and iron oxalate $(FeC_2O_4)$ are both relatively expensive and cause an increase in the production costs of the cathode material. $Fe_3(PO_4)_2 \cdot 8H_2O$ as another iron compound can be synthesized from $Na_2HPO_4$ and $Fe(II)SO_4 \cdot 7H_2O$, for example, but it is a hydrate whose hydration number is unstable and it is therefore difficult to control the feeding of it in a stoichiometric manner. Also, since $Fe_3(PO_4)_2 \cdot 8H_2O$ is obtained as a precipitate in the synthesis process thereof, a cumbersome process such as filtering is required to remove sodium ions and so on. However, it is difficult to remove sodium ions and so on completely, and such a process may bring the entry of impurities. To carry out the filtering completely to increase the purity of the calcination precursor, it is preferred to allow the crystals of $Fe_3(PO_4)_2 \cdot 8H_2O$ precipitates to grow until they reach a large diameter (about 10 μm or greater). However, when a mixture of $Fe_3(PO_4)_2 \cdot 8H_2O$ particles with a large diameter and $Li_3PO_4$ is calcined, the resulting $LiFePO_4$ particles have a large diameter and have low activity as a cathode material.

As described above, the conventional techniques for producing $LiFePO_4$ have problems of the entry of impurities and the necessity of a cumbersome process. Also, since primary materials which are inexpensive and easily available such as metal iron cannot be used, the cost is unavoidably high. Thus, any of the conventional techniques is not satisfactory as a method for producing $LiFePO_4$ in an industrial scale.

It is, therefore, an object of the present invention to provide a method for producing $LiFePO_4$ as a cathode material for a secondary battery reliably from primary materials which are easily available and inexpensive.

DISCLOSURE OF THE INVENTION

For the purpose of solving the above problems, the first aspect of the present invention is a method for producing a cathode material for a secondary battery, comprising the steps of mixing a compound which releases phosphate ions in a solution with water and metal iron to dissolve the metal iron, adding lithium carbonate, lithium hydroxide or a hydrate thereof to the solution, and calcining the reaction mixture to synthesize $LiFePO_4$.

According to the aspect, a cathode material for a secondary battery ($LiFePO_4$ as a cathode active material) can be produced directly from metal iron as a primary material which is inexpensive and easily available and phosphoric acid, lithium hydroxide or the like which are also inexpensive and easily available. Also, there is no need for a cumbersome process such as filtering of precipitate during the production process, and fine particles of a calcination precursor can be obtained directly from a stoichiometric mixture of the ingredients. Thus, the method of the present invention is a production technique which is highly practical in the production of a cathode material for a secondary battery in an industrial scale.

The second aspect of the present invention is the method for producing a cathode material for a secondary battery according to the first aspect, in which the calcining step has a first stage in a temperature range of room temperature to 300 through 450° C. and a second stage in a temperature range of room temperature to the calcination completion temperature, and the second stage of the calcining step is carried out after addition of a substance from which conductive carbon is formed by pyrolysis to the ingredients after the first stage of the calcining step.

According to the second aspect, since the second stage of the calcining step is carried out after addition of a substance from which conductive carbon is formed by pyrolysis to the product of the first stage of the calcining step, the substance can be prevented from being foamed by gas (mainly, water vapor) generated by decomposition of the ingredients during the calcination. Thus, the substance in a molten form can be spread more evenly on the surfaces of $LiFePO_4$, allowing pyrolytic carbon to be deposited more uniformly. As a result, the resulting cathode material is provided with higher surface conductivity, and the particles of the cathode material are firmly and stably bonded together.

The third aspect of the present invention is the method for producing a cathode material for a secondary battery according to the second aspect, the calcining step is carried out after addition of conductive carbon to the ingredients before the first stage of the calcining step.

According to the third aspect, in addition to the same effect as that of the second aspect, the following effect can be achieved. Since conductive carbon is added to the ingredients before the first stage of the calcining step, it is possible to have the conductive carbon kept in contact with the ingredients during reaction under heating for a long time, so that, during this time, LiFePO$_4$ generated by the reaction enters between the conductive carbon particles by the diffusion of its constituent elements to form a homogeneous and stable carbon-LiFePO$_4$ composite and to effectively prevent sintering of LiFePO$_4$ particles.

The fourth aspect of the present invention is the method for producing a cathode material for a secondary battery according to the first aspect, the calcining step has a first stage in a temperature range of room temperature to 300 through 450° C. and a second stage in a temperature range of room temperature to the calcination completion temperature, and the calcining step is carried out after addition of conductive carbon to the ingredients before the first stage of the calcining step.

According to the fourth aspect, the growth of primary crystal particles of LiFePO$_4$ can be suppressed and LiFePO$_4$ particles with smaller diameter can be formed. That is, since conductive carbon is added to the ingredients before the first stage of the calcining step, it is possible to have the conductive carbon kept in contact with the ingredients during reaction under heating for a long time, so that, during this time, LiFePO$_4$ generated by the reaction enters between the conductive carbon particles by the diffusion of its constituent elements to form a homogeneous and stable carbon-LiFePO$_4$ composite.

The fifth aspect of the present invention is the method for producing a cathode material for a secondary battery according to the second or third aspect, in which the substance from which conductive carbon is formed by pyrolysis is bitumen. Bitumen is turned into conductive carbon by pyrolysis and imparts conductivity to the cathode material.

The sixth aspect of the present invention is the method for producing a cathode material for a secondary battery according to the fifth aspect, in which the bitumen is a coal pitch which has a softening point in a range of 80 to 350° C. and a pyrolytic weight-loss initiation temperature in a range of 350 to 450° C. and from which conductive carbon is formed by pyrolysis and calcination at a temperature of 500 to 800° C. A coal pitch having above properties is very inexpensive, and excellent as a substance from which conductive carbon is formed since it is melted and spread evenly over the surfaces of the ingredient particles during calcination, and is turned into carbon deposits with high conductivity by pyrolysis.

The seventh aspect of the present invention is the method for producing a cathode material for a secondary battery according to the second or third aspect, in which the substance from which conductive carbon is formed by pyrolysis is a saccharide. The use of a saccharide can provide excellent crystal-growth inhibiting effect and conductivity-imparting effect. This is because a saccharide is turned into conductive carbon by pyrolysis and imparts conductivity to the cathode material and, presumably, because a multiplicity of hydroxyl groups contained in the saccharide act strong on the surfaces of the particles of the ingredients and generated LiFePO$_4$ and prevent the growth of crystals.

The eighth aspect of the present invention is the method for producing a cathode material for a secondary battery according to the seventh aspect, in which the saccharide is one which is decomposed at a temperature in a range of 250° C. or higher to lower than 500° C. and gets melted at least partially once in the course of heating from 150° C. up to the temperature at which it is decomposed and from which conductive carbon is formed by pyrolysis and calcination at a temperature not lower than 500° C. and not higher than 800° C. A saccharide having above specific properties is melted and adequately coated on the surfaces of the LiFePO$_4$ particles during the reaction under heating, and is turned into conductive carbon deposits properly on the surfaces of the generated LiFePO$_4$ particles by pyrolysis. Also, the saccharide can prevent the growth of crystals during this process as described before. Thus, the use of a saccharide having above specific properties can provide excellent crystal-growth inhibiting effect and conductivity-imparting effect.

The ninth aspect of the present invention is the method for producing a cathode material for a secondary battery according to any one of the first to eights aspects, in which one or more selected from the group consisting of hydrogen, water and water vapor is added at least when the temperature is in a range of 500° C. or higher during the calcining step. According to the ninth aspect, the growth of primary crystal particles of the cathode material LiFePO$_4$ can be suppressed and the particles of the resulting cathode material can be small.

In the calcining step having a first stage in a temperature range of room temperature to 300 through 450° C. and a second stage in a temperature range of room temperature to the calcination completion temperature, when the second stage of the calcining step is carried out after addition of a substance from which conductive carbon is formed by pyrolysis to the product of the first stage of the calcining step and when hydrogen and/or water (water or water vapor) is added at least when the temperature is in a range of 500° C. or higher during the second stage of the calcining step, it is possible to form primary particles of LiFePO$_4$ with a small diameter efficiently and achieve uniform and stable deposits of conductive carbon on the LiFePO$_4$ particles. It is, therefore, possible to obtain high cathode performance in addition to the effect of the second aspect. During this process, when the added hydrogen (including hydrogen generated from water) is brought into contact with the conductive carbon precursor substance which undergoes melting and pyrolysis when heated such as a coal pitch or saccharide, the melt viscosity of the substance is lowered by, presumably, a hydrogen addition reaction and allows the formation of carbon deposits in a better state.

In the calcining step having a first stage in a temperature range of room temperature to 300 through 450° C. and a second stage in a temperature range of room temperature to the calcination completion temperature, when conductive carbon is added to the ingredients before the first stage of the calcining step and the second stage of the calcining step is carried out after addition of a substance from which conductive carbon is formed by pyrolysis to the product of the first stage of the calcining step and when hydrogen and/or water (water or water vapor) is added at least when the temperature is in a range of 500° C. or higher during the second stage of the calcining step, it is possible to form primary particles of LiFePO$_4$ with a small diameter efficiently and achieve uniform and stable deposits of conductive carbon on the LiFePO$_4$ particles. It is, therefore, possible to obtain higher cathode performance in addition to the effect of the third aspect.

In the calcining step having a first stage in a temperature range of room temperature to 300-450° C. and a second stage in a temperature range of room temperature to the calcination completion temperature, when conductive carbon is added to the ingredients before the first stage of the calcining step and when hydrogen and/or water (water or water vapor) is added at least when the temperature is in a range of 500° C. or higher during the second stage of the calcining step, it is possible to achieve the effect of forming primary particles of LiFePO$_4$ with a small diameter efficiently in addition to the effect of the fourth aspect.

Also, according to the ninth aspect, the target cathode material can be synthesized from the ingredients reliably without the possibility that the ingredients cannot be fully calcined and chemically changed into the final product or intermediate products remains in the final product. Hydrogen and/or water have a strong crystal-growth inhibiting effect and a strong effect of improving the adhesion of the substance from which conductive carbon is formed by pyrolysis to $LiFePO_4$, and are easy to handle, inexpensive and efficient. Further, when the substance from which conductive carbon is formed by pyrolysis is a bitumen, especially, a coal pitch which has a softening point in a range of 80 to 350° C. and a pyrolytic weight-loss initiation temperature in a range of 350 to 450° C. and from which conductive carbon is formed by pyrolysis and calcination at a temperature of 500 to 800° C., the coal pitch is brought into contact with hydrogen and/or water in the process of melting and pyrolysis at least when the temperature is in a range of 500° C. or higher during the second stage of the calcining step. Thus, the state of the conductive carbon deposits on the resulting $LiFePO_4$ particles can be better for the performance of the cathode.

When the substance from which conductive carbon is formed by pyrolysis is a saccharide which is decomposed at a temperature in a range of 250° C. or higher to lower than 500° C. and gets partially melted at least once in the course of heating from 150° C. up to the temperature at which it is decomposed and from which conductive carbon is formed by pyrolysis and calcination at a temperature not lower than 500° C. and not higher than 800° C. (such as dextrin), the saccharide is brought into contact with hydrogen and/or water in the process of melting and pyrolysis at least when the temperature is in a range of 500° C. or higher during the second stage of the calcining step. Thus, the state of the conductive carbon deposits on the resulting $LiFePO_4$ particles can be better for the performance of the cathode.

In the present invention to "add" gaseous hydrogen or water vapor include conducting calcination of a material in the presence of hydrogen gas (in an atmosphere of hydrogen or the like). Also, as the hydrogen to be added during the calcining step, the hydrogen generated as byproduct in synthesizing the calcination precursor by reacting metal iron and a compound which releases phosphate ions as primary materials in a solution (phosphoric acid, phosphorus pentoxide, diammonium hydrogenphosphate, etc.) can be used.

The tenth aspect of the present invention is a secondary battery using the cathode material $LiFePO_4$ for a secondary battery produced by a method according to any one of the first to ninth aspects as a constituent component.

The secondary battery using the cathode material $LiFePO_4$ produced by the method of the present invention is a secondary battery with potential efficiency and effective discharge capacity in the practical level.

BEST MODE FOR CARRYING OUT THE INVENTION

Figure 1:
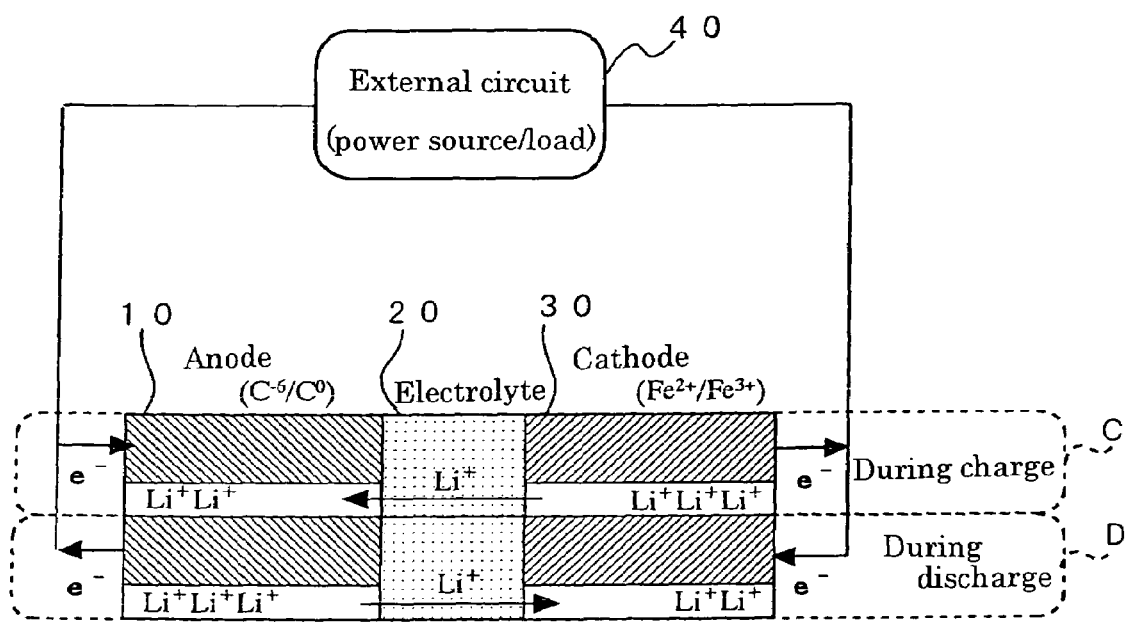
FIG. 1 is a schematic view for explaining the charge and discharge behaviors of a secondary battery, in which designated as 10 is an anode, as 20 is an electrolyte, as 30 is a cathode, as 40 is an external circuit, as C is the behavior during charge, and as D is the behavior during discharge.

The method for producing a cathode material for a secondary battery according to the present invention has the steps of mixing a compound which releases phosphate ions in a solution with water and metal iron to dissolve the metal iron, adding lithium carbonate, lithium hydroxide or a hydrate thereof to the mixture, and calcining the reaction product.

The cathode material for a secondary battery according to the present invention can be suitably used as a cathode material for lithium secondary batteries such as lithium battery, lithium ion battery, and lithium polymer battery. In the present invention, the term "cathode material" used generally synonymously with "$LiFePO_4$" itself is also used as the meaning of $LiFePO_4$ particles on which conductive carbon is deposited and $LiFePO_4$ particles mixed with conductive carbon as well as $LiFePO_4$ itself.

Since $LiFePO_4$ does not undergo any substantial change in crystal structure [orthorhombic Pnma (olivine type)] when subjected to electrochemical oxidation-reduction, the substance can be used as a cathode material for an alkali metal secondary battery which can be charged and discharged repeatedly. As a cathode material, the substance, in its own state, is in a state corresponding to a discharged state, and, when oxidation of central metal element Fe accompanied by undoping of the alkali metal Li occurs by electrochemical oxidation at its interface with an electrolyte, the cathode material is brought into a charged state. When the cathode material in the charged state is subjected to electrochemical reduction, reduction of central metal element Fe accompanied by redoping of the alkali metal Li occurs and the cathode material returns to the initial discharged state.

The ingredients of the cathode material are a compound which releases phosphate ions in a solution, metal iron, a lithium source compound and water. When the molar ratio of phosphor, iron and lithium in the ingredients is adjusted to 1:1:1, the generation of impurities during the calcination process and entry of impurities into the cathode material can be minimized.

Usable examples of the compound which releases phosphate ions in a solution include phosphoric acid $H_3PO_4$, phosphorous pentoxide $P_2O_5$, ammonium dihydrogenphosphate $NH_4H_2PO_4$, and diammonium hydrogenphosphate $(NH_4)_2HPO_4$. Among these, phosphoric acid, phosphorous pentoxide, ammonium dihydrogenphosphate are preferred since the iron can be kept under relatively strong acidic conditions during the process of dissolving. Although these compounds may be commercially available reagents, when phosphoric acid is used, it is preferred to measure its purity precisely by titration in advance and calculate a factor for stoichiometric precision.

As the lithium source compound, it is preferred to select a compound from which only Li remains in the target cathode material after the calcination (Li containing degradable volatile compound). Usable examples of the Li containing degradable volatile compound include hydroxides such as lithium hydroxide LiOH, carbonates such as $Li_2CO_3$, organic acid salts of Li, and hydrates thereof ($LiOH \cdot H_2O$, etc.).

As the ingredient for introducing Fe, metal iron as a primary material which is inexpensive and easily available can be used. The metal iron is preferably in the form of particles with a diameter of 200 μm or smaller, preferably 100 μm or smaller.

In mixing the above ingredients, the compound which releases phosphate ions in a solution such as phosphoric acid, metal iron and water are first mixed to dissolve and react the metal iron completely. In order to dissolve the metal iron, grinding and/or heating (refluxing or the like), for example, can be performed.

The grinding is conducted to apply a shear force to the metal iron in the solution to renew the surfaces thereof. The yield of the cathode material can be thereby improved. The grinding is preferably conducted in an automatic grinding machine, ball mill or beads mill for about 30 minutes to 10 hours, although it depends on the efficiency of the grinding device. Irradiation of ultrasonic wave is also effective to complete the dissolution reaction.

Also, when the reactants are heated, the reduction resolution of the metal iron is accelerated and the yield of the cathode material can be improved. The heating is preferably carried out by refluxing in an inert gas, for example, to prevent oxidation of the iron. Refluxing is considered to be suitable for large-scale production since there is no need for a mechanical pulverizing process, which is relatively difficult to perform in a large scale.

In dissolving the iron, a volatile acid such as oxalic acid or hydrochloric acid may be added to increase the acid concentration, or a volatile oxidizing agent such as oxygen, hydrogen peroxide, halogen (bromine, chlorine, etc.), or an oxyhalide such as hypochlorous acid or bleaching powder may be allowed to be coexist. Addition of nitric acid, which is a volatile acid which is both oxidative and acidic, is also effective. These substances are preferably used in an amount equal to or less than required for the oxidation of iron from its metallic form to iron (II) ions. Although the dissolution of the metal iron into the solution of phosphoric acid or the like can be thereby accelerated, the volatile acid and oxidizing agent and so on are removed by the calcination process and does not remain in the cathode material.

When ultrasonic wave is irradiated during the synthesis reaction of the calcination precursor by addition of an acid, the reaction can be accelerated. This is considered to be because the irradiation of ultrasonic wave promotes local peeling of reaction product which is generated on the surfaces of metal iron as the reaction proceeds. When a beads mill type synthesizing device, which has higher pulverizing efficiency than automatic grinding machine and planetary ball mill, is used, the same effect can be expected.

Next, lithium hydroxide as lithium source is added to the solution in which the iron has been dissolved. After the addition of the lithium source, pulverizing or grinding is preferably conducted as needed.

In the method of the present invention, the reaction process of iron phosphoric acid, and lithium hydrogen hydrate as ingredients is considered to be as follows.

Reaction in the reaction process before calcination (reaction in the aqueous solution):

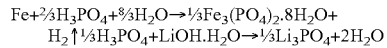

The hydrogen generated during the reaction process before calcination can be collected and added when the temperature is in a prescribed range during calcination described later. When the primary reaction products $Fe_3(PO_4)_2$ and $Li_3PO_4$ of the above reaction are calcined, they are changed to $LiFePO_4$ according to the following reaction.

Reaction in the calcination process:

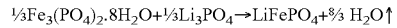

The calcination is carried out in a calcination process at temperatures ranging from 300 to 900° C. as generally employed under calcination conditions of suitable temperature range and treatment time. The calcination is preferably carried out in an atmosphere free of oxygen gas (for example, in an atmosphere of an inert gas such as argon, nitrogen or helium) to prevent the generation of oxide impurities and promote reduction of residual oxide impurities.

When an acid (such as oxalic acid or hydrochloric acid) is added in the ingredients, the reaction in the reaction process before calcination (reaction in the aqueous solution) takes a different course from the one described above. That is, in the calcination precursor obtained by adding an acid, products different from the products, which are generated when no acid is added, are generated (for example, ferrous oxalate dihydrate and lithium phosphate when oxalic acid is added, and iron chloride tetrahydrate and lithium chloride when hydrochloric acid is added). It is considered that the reaction products in the calcination precursors are different because oxalic acid is a bidentate ligand and has a high complex stability, and hydrochloric acid is an acid stronger than phosphoric acid. When such an acid is added, the residual amount of metal iron in the calcination precursor can be decreased.

In the method of the present invention, conductive carbon or a conductive carbon precursor (a substance from which conductive carbon is formed by pyrolysis) may be added before the calcination.

Examples of the conductive carbon include graphite carbon and amorphous carbon. The graphite carbon and amorphous carbon include what is called soot and carbon black.

Examples of the conductive carbon precursor include bitumens (what is called asphalt; including pitches obtained from coals or petroleum sludge), a saccharide, styrene-divinylbenzene copolymers, ABS resins, phenol resins, and crosslinked polymers containing aromatic groups. Among these, bitumens (especially, what is called refined and coal pitch) and a saccharide are preferred. Bitumens and a saccharide are turned into conductive carbon by pyrolysis and impart conductivity to the cathode material. In particular, a refined coal pitch, which is very inexpensive, is melted and spread evenly over the surfaces of the ingredient particles during calcination, and is pyrolyzed and turned into carbon deposits with high conductivity by calcination at a relatively low temperature (650 to 800° C.). When a saccharide is used, a multiplicity of hydroxyl groups contained in the saccharide act strong on the surfaces of the particles of the ingredients and generated LiFePO$_4$ and prevent the growth of crystals. Thus, the use of a saccharide can provide excellent crystal-growth inhibiting effect and conductivity-imparting effect.

In particular, a coal pitch which has a softening point in a range of 80 to 350° C. and a pyrolytic weight-loss initiation temperature in a range of 350 to 450° C. and from which conductive carbon is formed by pyrolysis and calcination at a temperature not lower than 500° C. and not higher than 800° C. is suitably used. In order to further improve the performance of the cathode, a refined coal pitch having a softening point in a range of 200 to 300° C. is more preferred. It is needless to say that impurities contained in the refined coal pitch should not adversely affect the performance of the cathode, and a refined coal pitch having an ash content of not higher than 5000 ppm is particularly preferred.

Especially preferred as the saccharide is one which is decomposed in a temperature range of not lower than 250° C. to higher than 500° C. and gets melted at least partially once in the course of heating from 150° C. up to the above-described temperature range and from which conductive carbon is formed by pyrolysis and calcination at a temperature not lower than 500° C. and not higher than 800° C. This is because a saccharide having above specific properties is melted and adequately coated on the surfaces of the LiFePO$_4$ particles during the reaction under heating and is turned into conductive carbon deposits properly on the surfaces of the generated LiFePO$_4$ particles by pyrolysis, and because it can prevent the growth of crystals during this process as described before. In order to provide good conductivity, the pyrolysis temperature is preferably in a range of not lower than 570° C. to not higher than 850° C., more preferably in a range of not lower than 650° C. to not higher than 800° C. Further, the saccharide is preferably form by calcination at least 15% by weight, preferably at least 20% by weight, of conductive carbon based on the dry weight of the saccharide before the calcination so that the amount of the resulting conductive carbon can be easily controlled. Examples of the saccharide having above properties include oligosaccharides such as dextrin, and high-molecular saccharides such as soluble starches and slightly crosslinked starches prone to melting when heated (for example, starches containing 50% or more of amylose).

The conductive carbon or the conductive carbon precursor typified by refined coal pitch and a saccharide is added and mixed into the ingredients (or the intermediate product) at proper timing. Upon addition, an operation for sufficiently mixing the conductive carbon or conductive carbon precursor with the ingredients, such as pulverization or kneading, may be carried out as needed.

The conductive carbon or the conductive carbon precursor is added such that the concentration by weight of conductive carbon in the resulting cathode material falls within a range of not lower than 0.1% to not higher than 10%, preferably within a range of not lower than 0.5% to not higher than 7%, more preferably within a range of not lower than 1% to not higher than 5%.

In the method of the present invention, although the calcination can be carried out in a single stage consisting of the heating and its subsequent temperature maintenance, the calcination process may be divided into two stages, that is, a calcining step in a lower temperature range (generally, in a temperature range of room temperature to 300 through 450° C.; which may be hereinafter referred to as "preliminary calcination") as a first stage and a calcining step in a higher temperature range (generally, in a range of room temperature to the calcination completion temperature (about 500 to 800° C.); which may be hereinafter referred to as "final calcination") as a second stage. In this case, when the conductive carbon or conductive carbon precursor is mixed at the timing described below, the performance of the resulting cathode material can be further improved.

In the preliminary calcination, the ingredients of the cathode material are heated and reacted into an intermediate phase before transforming to the final cathode material, and, at this time, pyrolytic gas is generated in many cases. As the temperature at which the preliminary calcination should be finished, a temperature at which the gas generation has been almost completed but the reaction into the cathode material as the final product has not fully proceeded (in other words, a temperature at which there is still a room for the constituent elements in the LiFePO$_4$ to undergo rediffusion and homogenization in the final calcination in a higher temperature range as the second stage) is selected.

In the final calcination following the preliminary calcination, the temperature is raised to and maintained in a range in which the rediffusion and homogenization of the constituent elements occurs, the reaction into the cathode material is completed, and, moreover, crystal growth by sintering or the like can be prevented as much as possible.

When a conductive carbon precursor, especially a coal pitch or a saccharide which is melted by heating, is used, it is preferred to conduct the final calcination after adding it to the product of the preliminary calcination (in the intermediate phase where the generation of gas from the ingredients has been almost completed) for the provision of a higher-performance cathode material although it may be added to the ingredients before the preliminary calcination (even in this case, the cathode performance can be fairly improved). This means to provide the step of adding the conductive carbon precursor to the ingredients between the preliminary calcination and the final calcination in the calcination process.

This makes it possible to prevent the conductive carbon precursor such as a coal pitch or saccharide which undergoes melting and pyrolysis by heating from being foamed by the gas given off from the ingredients, so that molten conductive carbon precursor can be spread more evenly on the surfaces of LiFePO$_4$, allowing pyrolytic carbon to be deposited more uniformly.

This is attributed to the following reason.

Since most of the gas produced from the decomposition of the primary reaction product is released during the preliminary calcination and substantially no gas is generated during the final calcination, the addition of the conductive carbon precursor after the preliminary calcination allows uniform deposition of conductive carbon. As a result, the resulting cathode material is provided with higher surface conductivity, and the particles of the cathode material are firmly and stably bonded together. When the conductive carbon precursor is added to the ingredients before the preliminary calcination, gas is vigorously given off from the ingredients during the preliminary calcination and the conductive carbon precursor which is in a molten state and has not been pyrolyzed completely is foamed and cannot be deposited evenly.

In the case of adding carbon which already has conductivity and no longer undergoes any substantial weight loss or change in form or no longer cause any substantial gas generation by heating (conductive carbon; for example, graphitic carbon or amorphous carbon such as soot or carbon black), it is preferred that a predetermined amount of such carbon is mixed with the ingredients before the preliminary calcination and the series of calcining steps is started with the preliminary calcination. This makes it possible to have the conductive carbon kept in contact with the ingredients during reaction under heating for a long time, so that, during this time, LiFePO$_4$ generated by the reaction enters between the conductive carbon particles by the diffusion of its constituent elements to form a homogeneous and stable carbon-$LiFePO_4$ composite and to effectively prevent sintering of $LiFePO_4$ particles.

Addition of both a conductive carbon precursor, for instance a substance which undergoes melting and pyrolysis when heated such as a coal pitch or saccharide, and conductive carbon is also effective to obtain a cathode material with high cathode performances. In this case, it is preferred to add the conductive carbon to the ingredients before the preliminary calcination, and to add the substance which undergoes melting and pyrolysis when heated such as a coal pitch or saccharide to the ingredients after the preliminary calcination.

In a preferred embodiment of the present invention, the ingredients are calcined while a predetermined amount of hydrogen or water (water, water vapor or the like) is continuously supplied together with an inert gas into a furnace. For example, hydrogen or water is added throughout the entire period of the calcination process, or while the temperature is in a range of 500° C. or lower to calcination completion temperature, preferably in a range of 400° C. or lower to the calcination completion temperature, more preferably in a range of 300° C. or lower to the calcination completion temperature.

When hydrogen in gas form is used, hydrogen can be supplied in a necessary and sufficient amount for a suitable period of time when the temperature is in a suitable range during the calcination process at temperatures ranging from 300 to 900° C. as generally employed, and the addition to oxygen atoms on the surface of $LiFePO_4$, removal of oxygen from there, reduction of $LiFePO_4$ and so on can be effectively induced.

In the method of the present invention, hydrogen can be added when the temperature is in a range of 500° C. or higher during the second stage of the calcination. For example, hydrogen is added when the temperature is in a range of 500° C. or lower to the calcination completion temperature, preferably in a range of 400° C. or lower to the calcination completion temperature, more preferably in a range of 300° C. or lower to the calcination completion temperature (almost throughout the entire calcination period, for example) during the second stage of the calcination process. In the above range, crystal growth is inhibited effectively presumably for reasons to be discussed later. Further, when hydrogen is added during the first stage of the calcination, the effect of preventing oxidation of $LiFePO_4$ by the reducing property of hydrogen can be expected.

The concentration by volume of hydrogen in the atmosphere in the above-described temperature range is between about 0.1% or higher and 20% or lower, preferably between 1% or higher and 10% or lower. The growth of $LiFePO_4$ crystal composed of the transition metal compound can be thereby inhibited properly.

Studies by the present inventors have found that, when the ingredients of the cathode material are calcined in the absence of oxygen gas while feeding hydrogen and/or water, a slight disorder occurs in the crystallinity of the resulting $LiFePO_4$ particles, and primary particles with a smaller diameter are formed. That is, it has been substantiated that hydrogen or water functions as an effective crystal growth inhibitor. This mechanism has not been clarified yet, but it is considered that when hydrogen atoms are bonded to oxygen atoms on the growing surfaces of $LiFePO_4$ crystal particles synthesized from the ingredients and growing during the calcination to form hydroxyl groups and molecules of water formed from the hydroxyl groups are removed again from the surfaces, the surface structure of the crystals is disturbed or disordered, and the growth of the particles is consequently inhibited.

Water functions as a crystal growth inhibitor as in the case with hydrogen. The reason has not been clarified yet, but it is considered that, as in the case where hydrogen gas is added, hydroxyl groups are formed on the surface of the ingredients and the cathode active material and delay the growth of crystals. Further, when water vapor is brought into contact with conductive carbon or a substance from which conductive carbon is formed by pyrolysis at a high temperature (about 500° C. or higher), what is called a water gas reaction occurs to form carbon monoxide and hydrogen, which also has the crystal-growth inhibiting effect and reducing effect. That is, when water is supplied continuously, it is possible to generate a large amount of hydrogen continuously and reliably by water gas reaction also in a high temperature range of 500° C. or higher and therefore to provide the crystal-growth inhibiting effect and reducing effect to the maximum extent.

Water can be supplied by spraying it into the furnace. Preferably, water is vaporizing in advance and supplied in the form of water vapor. The temperature range in which water is supplied and the amount of water can be the same as in the case of hydrogen. That is, it is preferred to supply water when the temperature is in a range of not lower than 500° C. to the calcination completion temperature during the second stage of the calcination process. For example, water is added when the temperature is in a range of 500° C. or lower to the calcination completion temperature, preferably in a range of 400° C. or lower to the calcination completion temperature, more preferably in a range of about 300° C. to the calcination completion temperature (almost throughout the entire calcination period, for example) during the second stage of the calcination process. Presumably, the growth of crystal is inhibited effectively because the addition of hydrogen to the oxygen atoms on the surface of the transition metal compound and formation of hydroxyl groups easily occurs in the above temperature range. Water may be also added during the first stage of the calcination process.

The concentration by volume of water vapor in the atmosphere in the above-described temperature range is between about 0.1% or higher and 20% or lower, preferably between 1% or higher and 10% or lower. The growth of $LiFePO_4$ crystal can be thereby inhibited properly.

When hydrogen is supplied during the final calcination, the carbon deposits can be in a better state because, presumably, when the added hydrogen (including hydrogen generated from water) is brought into contact with the substance which undergoes melting and pyrolysis when heated such as a coal pitch or saccharide, the melt viscosity of the substance is lowered. For example, in the case where a coal pitch which has a softening point in a range of 80 to 350° C. and a pyrolytic weight-loss initiation temperature in a range of 350 to 450° C. and from which conductive carbon is formed by pyrolysis and calcination at a temperature not lower than 500° C. and not higher than 800° C. is used, when hydrogen (including hydrogen generated from water) acts on the substance converted into a molten form during the calcination, the substance has a lower melt viscosity and higher flowability to form uniform deposits of conductive carbon with a small coating thickness.

The outline of the method according to the present invention will be described taking the case of the two-stage calcination as an example.

When the conductive carbon precursor is added after the preliminary calcination as the first stage of the two-stage calcination process, the following steps are carried out in this order; [pulverization, mixing, and/or grinding of the ingredients], [first-stage calcination], [addition of the conductive carbon precursor (the mixture may be pulverized, mixed and/or ground as needed)], and [second stage final calcination].

When the conductive carbon is added before the preliminary calcination as the first stage of the two-stage calcination process and a conductive carbon precursor is added after the preliminary calcination, the following steps are carried out in this order; [addition of the conductive carbon (which may be pulverized, mixed and/or ground together with the other ingredients as needed)], [first-stage preliminary calcination], [addition of the conductive carbon precursor (which may be pulverized, mixed and/or ground together with the ingredient (intermediate product) as needed), and [second-stage final calcination].

When the conductive carbon is added before the preliminary calcination as the first stage of the two-stage calcination process, the following steps are carried out in this order; [addition of the conductive carbon (which may be pulverized, mixed, and/or ground together with the other ingredients as needed)], [first-stage preliminary calcination], [pulverization, mixing, and/or grinding of the ingredient (intermediate product) as needed], and [second-stage final calcination].

In the above cases, if hydrogen or water is added, it is added at least for a period during the second-stage final calcinations step, preferably, throughout the second-stage final calcining step, more preferably, at least for a period during the first-stage preliminary calcining step in addition to throughout the second-stage final calcining step. Also, as the hydrogen to be added during the calcination process, the hydrogen generated as byproduct in synthesizing the calcination precursor by reacting metal iron and a compound which releases phosphate ions as primary materials in a solution (phosphoric acid, phosphorus pentoxide, diammonium hydrogenphosphate, etc.) can be used as described before. In this case, when the series of steps is repeated several times to produce several batches of product, since the calcination process and the step of synthesizing the calcination precursor for the next batch can be conducted simultaneously, hydrogen generated in the latter can be used in the former.

Examples of the secondary battery using the cathode material of the present invention obtained as described above include metal lithium battery, lithium ion battery and lithium polymer battery.

Taking a lithium ion battery as an example, the description will be hereinafter made of a fundamental construction of a secondary battery. A lithium ion battery is a secondary battery characterized in that $Li^+$ ions move back and forth between an anode active material and a cathode active material upon charging and discharging (see FIG. 1), as commonly called "rocking chair type" or "(badminton) shuttlecock type." Upon charging, $Li^+$ ions are inserted into the anode (carbon such as graphite is used in currently-available batteries) to form an intercalation compound (at this time, the anode carbon is reduced while the $Li^+$-extracted cathode is oxidized). During discharge, $Li^+$ ions are inserted into the cathode to form an iron compound-lithium complex (at this time, the iron in the cathode is reduced while the $Li^+$-extracted anode is oxidized to return to graphite or the like). During charge and discharge, $Li^+$ ions moves back and force through the electrolyte to transport electrical charges. As the electrolyte, a liquid electrolyte prepared by dissolving an electrolyte salt such as $LiPF_6$, $LiCF_3SO_3$, or $LiClO_4$ in a mixed solvent of a cyclic organic solvent such as ethylene carbonate, propylene carbonate, or γ-butyrolactone and a chain organic solvent such as dimethyl carbonate, or ethyl methyl carbonate; a gel electrolyte prepared by impregnating an electrolyte as above into a polymer gel substance; or a solid polymer electrolyte prepared by impregnating a liquid electrolyte as above into a partially crosslinked polyethylene oxide. When a liquid electrolyte is used, the cathode and the anode have to be insulated from each other by interposing therebetween a porous separating membrane (separator) made of a polyolefin or the like to prevent them from short-circuiting. The cathode and anode are respectively produced by adding a predetermined amount of a conductivity-imparting material such as carbon black and a binder, for example, a synthetic resin such as polytetrafluoroethylene, polyvinylidene fluoride or fluororesin or a synthetic rubber such as ethylene propylene rubber to the cathode or anode material, kneading the mixture with or without a polar organic solvent and forming the kneaded mixture into a thin film. Then, current collection is conducted using a metal foil or metal screen to construct a battery. When metal lithium is used for the anode, transitions between Li(O) and $Li^+$ take place at the anode upon charging and discharging and a battery is thereby formed.

As has been described previously, according to the present invention, a cathode material $LiFePO_4$ for a secondary battery with high purity and high activity can be produced directly from primary materials which are inexpensive and easily available. In addition, there is no need for a cumbersome process such as filtering during the production process. Thus, the method of the present invention is a production technique which is highly practical in the production of a cathode material for a secondary battery in an industrial scale.

The secondary battery using the cathode material $LiFePO_4$ produced by the method of the present invention is a secondary battery with potential efficiency and effective discharge capacity in the practical level.

Although the following Examples will further describe the present invention in more detail, the present invention is not limited by these Examples.

EXAMPLE 1

(1) Preparation of Cathode Material:

A cathode material $LiFePO_4$ was synthesized by the following procedure.

A mixture of 4.5 g of iron particles [under 325 mesh (44 μm) (purity 99.9%): product of The Nilaco Corporation] and 9.2901 g of 85% $H_3PO_4$ (product of Wako Pure Chemical Industries, Ltd.) was ground and reacted in an automatic grinding machine for two hours (when the viscosity of the mixture increased during grinding, distilled water was added to decrease the viscosity).

The reaction product was finely pulverized in a planetary ball mill for two hours. After addition of 3.381 g of $LiOH.H_2O$, the mixture was further pulverized in the planetary ball mill for one hour. After removing water from the pulverized mixture with an evaporator, the mixture was vacuum-dried in a desiccator for two days. After addition of 0.6630 g of a coal pitch (product of Adchemco Corp., softening point: 250° C.), the mixture was manually ground for five minute to obtain a primary reaction product (calcination precursor).

The preliminary calcination was carried out in an atmosphere of nitrogen at 400° C. for five hours. After gas-cooled, the calcined product was taken out of the furnace and manually ground for five minutes (preliminarily calcined intermediate product).

The final calcination was carried out by maintaining the intermediate product at 300° C. for five hours and then at 725° C. for 10 hours in an atmosphere of nitrogen, thereby obtaining a target cathode material.

Figure 2:
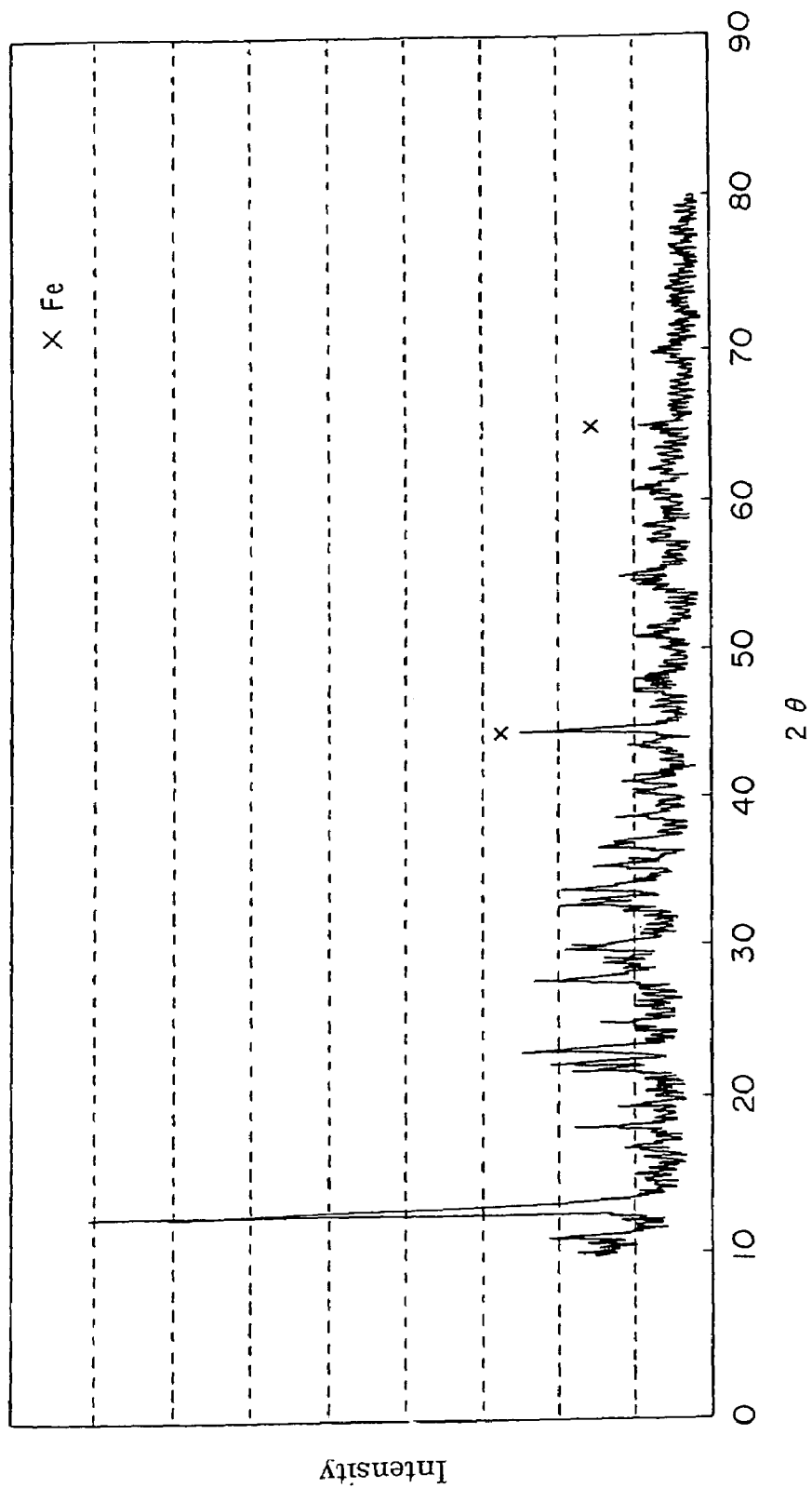
FIG. 2 is a graph showing the result of X-ray diffraction analysis of a primary reaction product obtained in Example 1.
Figure 3:
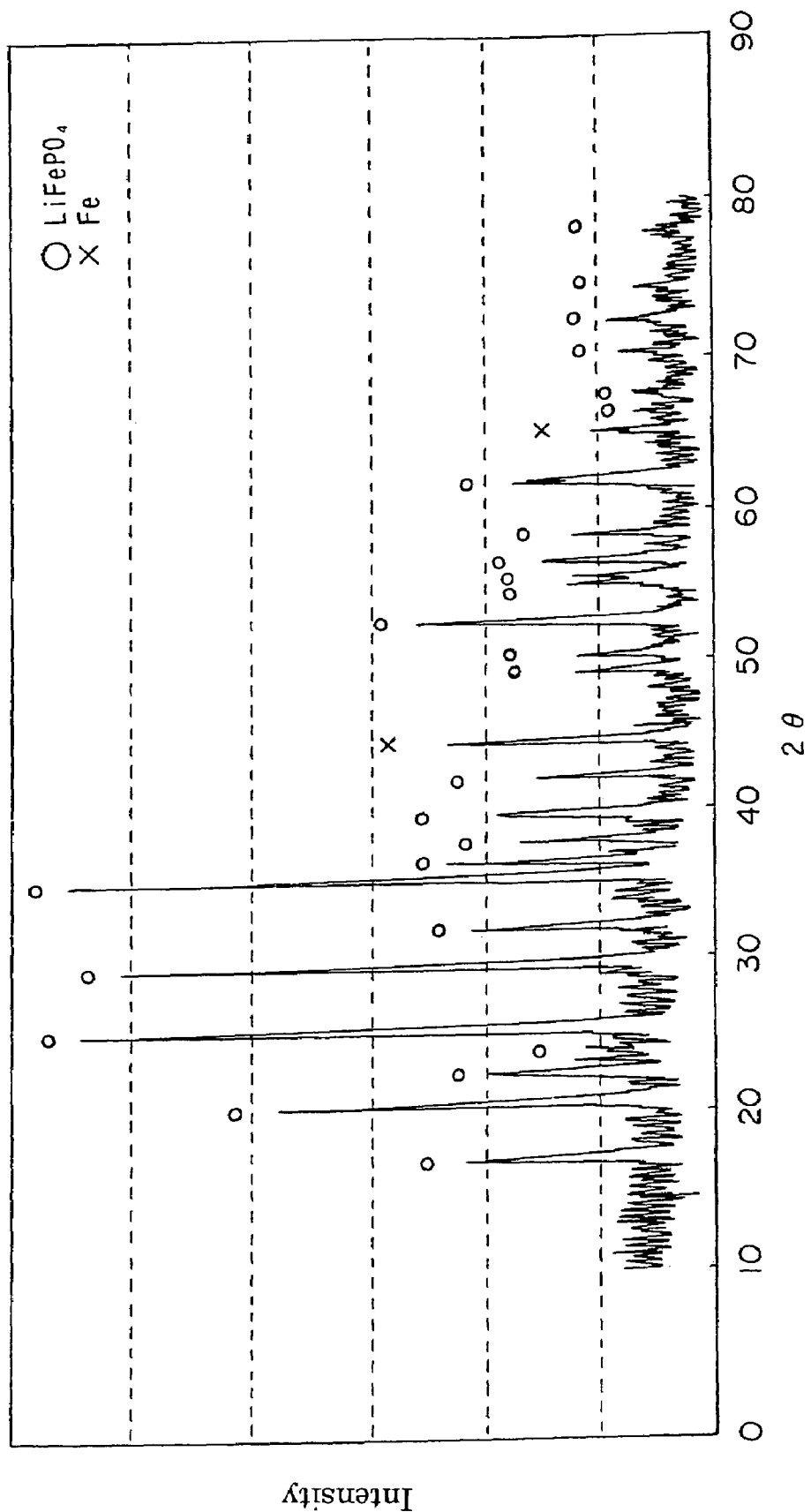
FIG. 3 is a graph showing the result of X-ray diffraction analysis of a preliminarily calcined intermediate product obtained in Example 1.
Figure 4:
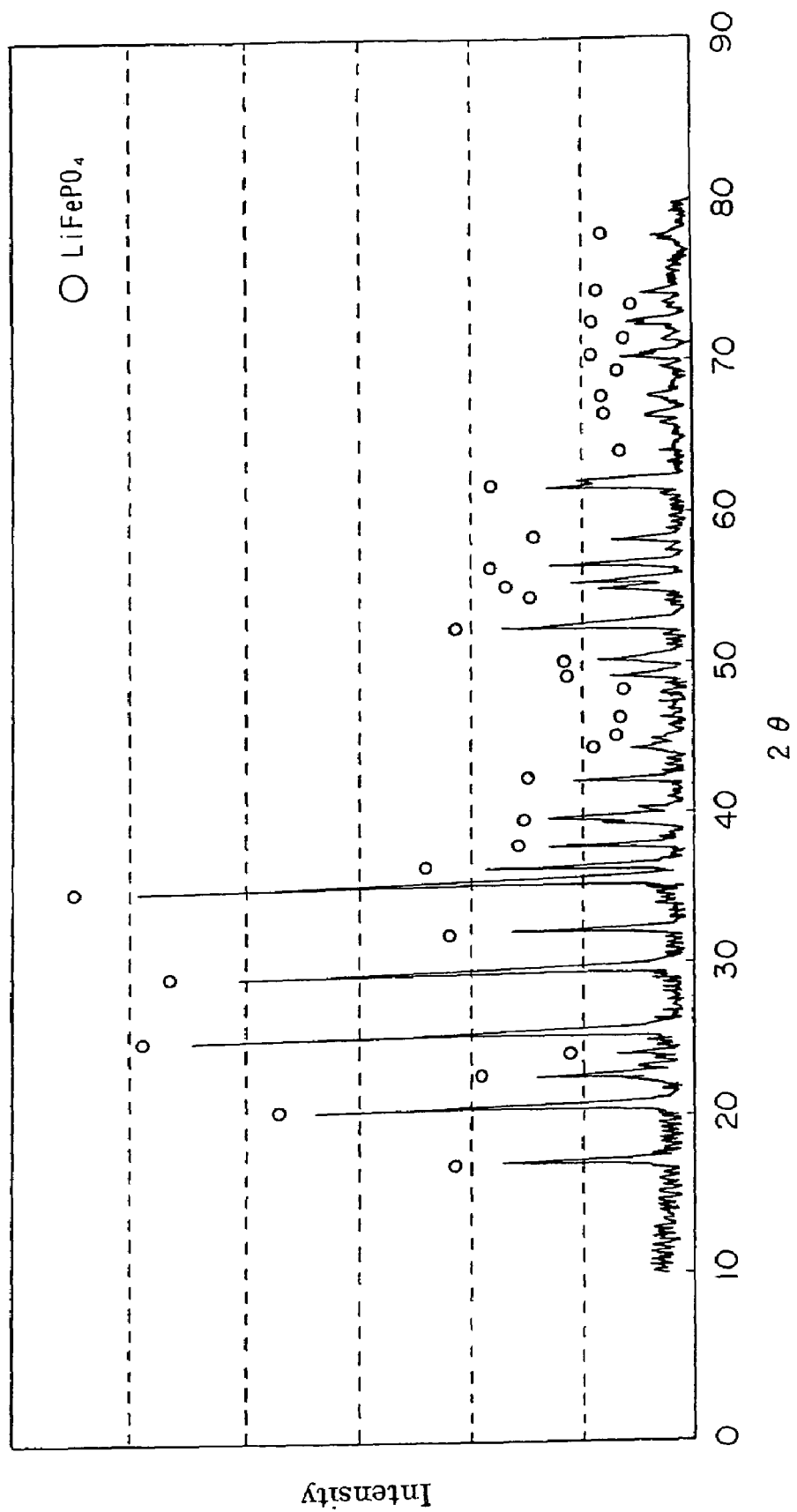
FIG. 4 is a graph showing the result of X-ray diffraction analysis of a cathode material obtained in Example 1.

X-ray diffraction analysis was performed on the primary reaction product, preliminarily calcined intermediate product and the cathode material. The results are shown in FIGS. 2 to 4, respectively. The synthesized cathode material was identified as LiFePO$_4$ having an olivine-type crystal structure by the X-ray diffraction analysis.

Also, according to the results of the X-ray diffraction analysis, metal iron remained in the preliminarily calcined intermediate product (FIG. 3) while the peaks corresponding to metal iron almost disappeared in the cathode material after the final calcination (FIG. 4). When the surface of the cathode material was observed under an electron microscope, aggregates (about 1 μm) of fine granular crystals with a diameter of 0.5 μm or smaller were observed. Variation in the size of the granular crystals and existence of needle crystals were not observed, which indicated that uniform crystal formation took place.

The result of elemental analysis of the cathode material is shown below.

<Result of elemental analysis> (molar ratio with respect to P)
Li:Fe:P=0.987:0.989:1
C 4.35% by weight (2) Fabrication of Secondary Battery:

The cathode material, acetylene black as a conductivity-imparting material [Denka Black (registered trademark), product of Denki Kagaku Kogyo K. K.; 50% pressed product] and unsintered PTFE (polytetrafluoroethylene) powder as a binder were mixed at a ratio by weight of 70.6:24.4:5 and kneaded. The kneaded mixture was rolled into a sheet with a thickness of 0.7 mm, and the sheet was punched out into discs with a diameter of 1.0 cm to form a pellet as a cathode.

A metal titanium screen and a metal nickel screen were welded as cathode and anode current collectors, respectively, to a coin-type battery case made of stainless steel (Model No. CR2032) by spot welding. The cathode and an anode made of a metal lithium foil were assembled in the battery case with a porous polyethylene separating membrane, Celgard 3501 (a product of Celgard K. K.) interposed between the cathode and the anode. The battery case was filled with a 1 M solution of LiPF$_6$ in a 1:1 mixed solvent of dimethyl carbonate and ethylene carbonate as an electrolyte solution, and then sealed to fabricate a coin-type lithium secondary battery. All the process of assembling the cathode and anode, separating membrane, and the electrolyte into a battery was performed in a dried argon-purged glove box.

Figure 5:
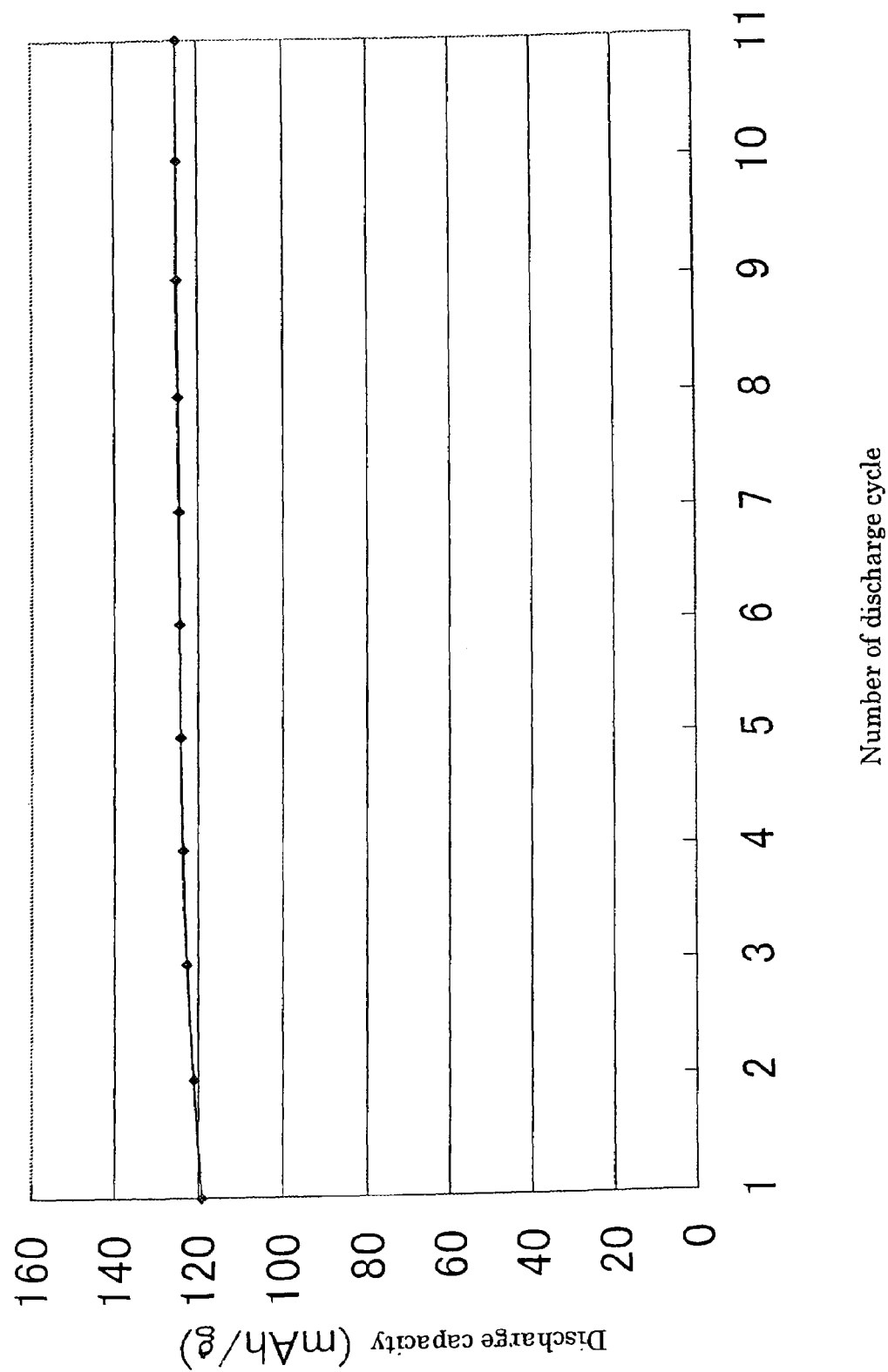
FIG. 5 is a graph showing the charge/discharge characteristics of a coin-type secondary battery obtained in Example 1.

The secondary battery with the cathode material produced as described above was repeatedly charged and discharged at a current density of 0.5 mA/cm$^2$ per apparent area of the cathode pellet in an operating voltage range of 3.0 V to 4.0 V. The initial discharge capacities in the first to eleventh cycles were as shown in FIG. 5 (the initial discharge capacities were standardized based on the weight of the cathode active material in the product).

The discharge capacity after the tenth cycle was 124.5 mAh/g, which still increased after that and reached to 131.0 mAh/g after the twentieth cycle.

EXAMPLE 2

(1) Preparation of Cathode Material:

A cathode material LiFePO$_4$ was synthesized by the following procedure.

A mixture of 4.5 g of iron particles [under 325 mesh (44 μm) (purity 99.9%): product of The Nilaco Corporation] and 9.2901 g of 85% H$_3$PO$_4$ (product of Wako Pure Chemical Industries, Ltd.) was ground and reacted in an automatic grinding machine for two hours (when the viscosity of the mixture increased during grinding, distilled water was added to decrease the viscosity).

The reaction product (calcination precursor) was finely pulverized in a planetary ball mill for two hours. After addition of 3.381 g of LiOH.H$_2$O, the mixture was further pulverized in a planetary ball mill for one hour. After removing water from the pulverized mixture with an evaporator, the mixture was vacuum-dried in a desiccator for two days.

The preliminary calcination was carried out in an atmosphere of nitrogen at 400° C. for five hours. After gas-cooled, the calcined product was taken out of the furnace and mixed with 0.6630 g of a coal pitch (product of Adchemco Corp., softening point: 250° C.). Then, the mixture was manually ground for five minutes (preliminarily calcined intermediate product).

The final calcination was carried out by maintaining the intermediate product at 300° C. for five hours and then at 725° C. for 10 hours in an atmosphere of nitrogen, thereby obtaining a target cathode material.

Figure 6:
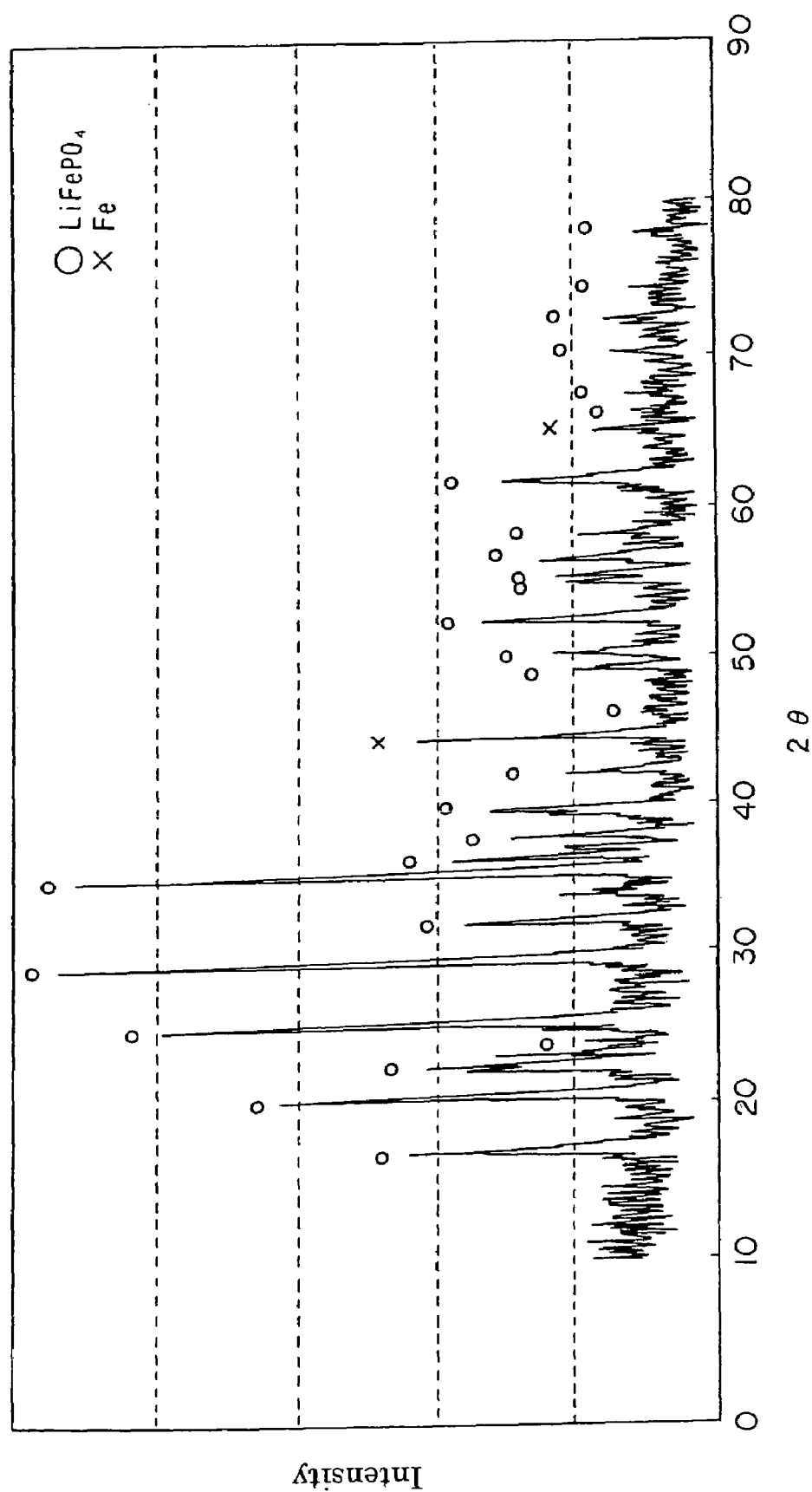
FIG. 6 is a graph showing the result of X-ray diffraction analysis of a preliminarily calcined intermediate product obtained in Example 2.
Figure 7:
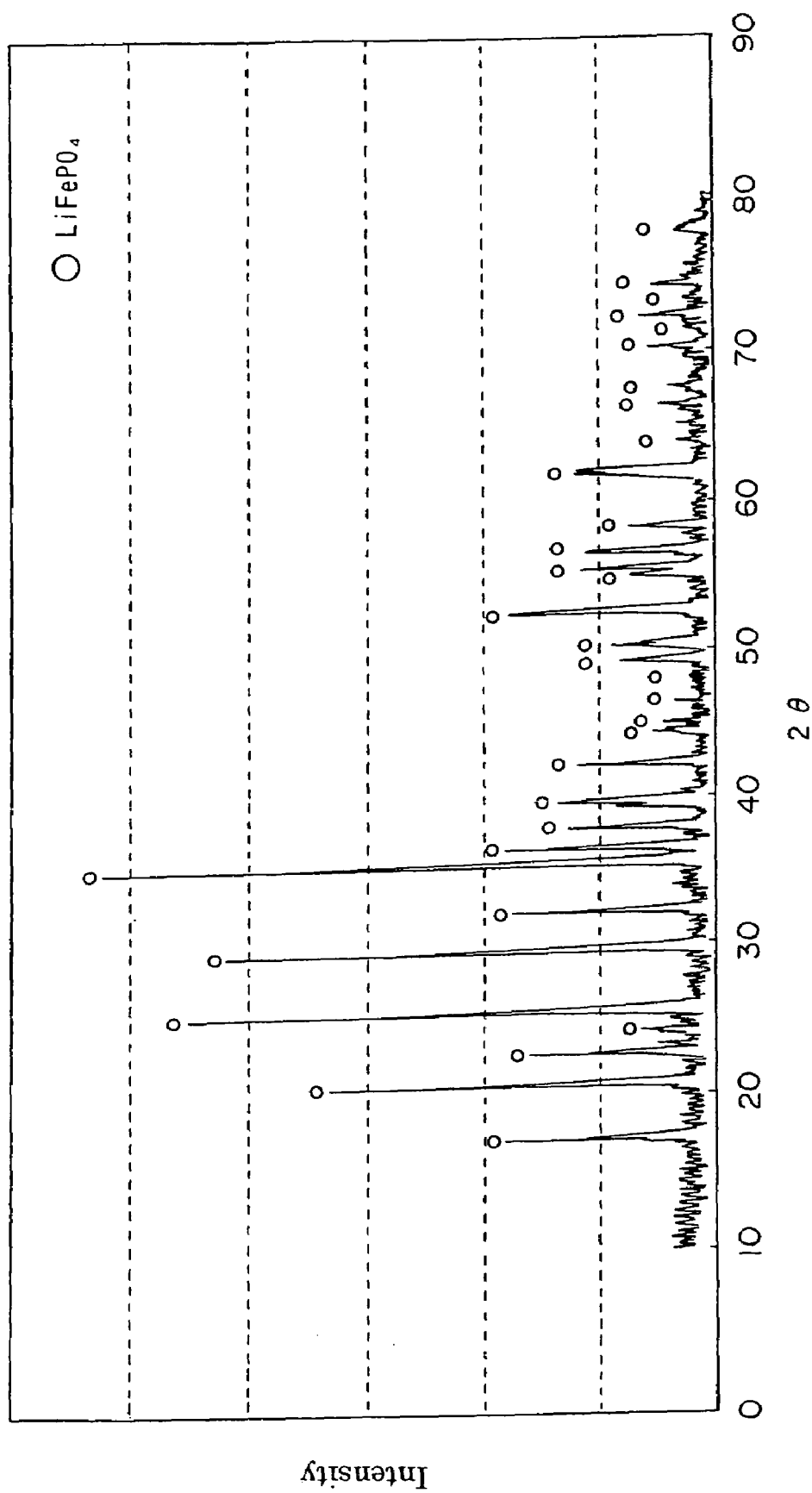
FIG. 7 is a graph showing the result of X-ray diffraction analysis of a cathode material obtained in Example 2.

X-ray diffraction analysis was performed on the preliminarily calcined intermediate product and the cathode material. The results are shown in FIGS. 6 to 7, respectively. The synthesized cathode material was identified as LiFePO$_4$ having an olivine-type crystal structure by the X-ray diffraction analysis.

Also, according to the results of the X-ray diffraction analysis, metal iron remained in the preliminarily calcined intermediate product (FIG. 6) while the peaks corresponding to metal iron almost disappeared in the cathode material after the final calcination (FIG. 7). When the surface of the cathode material was observed under an electron microscope, aggregates (about 1 μm) of fine granular crystals with a diameter of 0.5 μm or smaller were observed. Variation in the size of the granular crystals and existence of needle crystals were not observed, which indicated that uniform crystal formation took place.

The result of elemental analysis of the cathode material is shown below.

Figure 8:
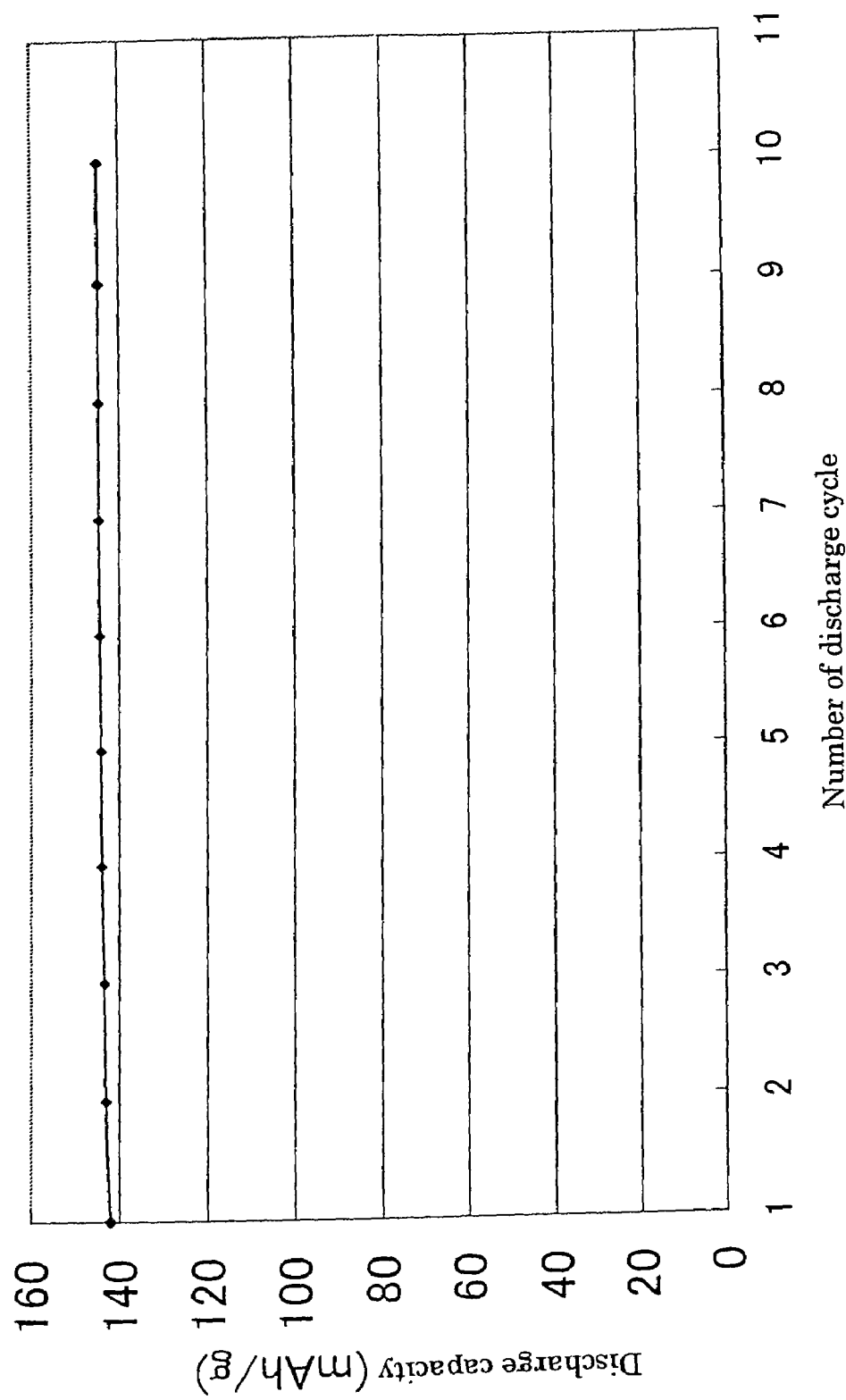
FIG. 8 is a graph showing the charge/discharge characteristics of a coin-type secondary battery obtained in Example 2.

<Result of elemental analysis> (molar ratio with respect to P)
Li:Fe:P=0.997:0.989:1
C 3.96% by weight (2) Fabrication of Secondary Battery:

Using the cathode material, a secondary battery was fabricated in the same manner as in Example 1. The secondary battery with the cathode material produced as described above was repeatedly charged and discharged at a current density of 0.5 mA/cm$^2$ per apparent area of the cathode pellet in an operating voltage range of 3.0 V to 4.0 V. The initial discharge capacities in the first to tenth cycles were as shown in FIG. 8 (the initial discharge capacities were standardized based on the weight of the cathode active material in the product).

The discharge capacity after the tenth cycle was 144.7 mAh/g, which still increased after that and reached to 147.2 mAh/g after the twentieth cycle.

As shown in Examples 1 and 2, according to the present invention, olivine-type lithium iron phosphate LiFePO$_4$ can be synthesized directly from primary materials which are inexpensive and easily available. Although the discharge capacities of the cathode materials obtained in the examples still have room for improvement, the method of the present invention can be regarded as a practical method which can be used as a novel synthesis method of LiFePO$_4$. When Examples 1 and 2 are compared, the discharge capacity in Example 2, in which the coal pitch was added after the preliminary calcination, was higher than that in Example 1, in which the coal pitch was added before the preliminary calcination. This indicates that the control of the timing, at which the conductive carbon precursor is added and mixed, is effective to improve the discharge capacity.

EXAMPLE 3

(1) Preparation of Cathode Material:

A cathode material $LiFePO_4$ was synthesized by the following procedure.

A mixture of 1.5 g of iron powder [under 325 mesh (44 μm) (purity 99.9%): product of The Nilaco Corporation], 3.0967 g of 85% $H_3PO_4$ (product of Wako Pure Chemical Industries, Ltd.), and 1.1191 cc of hydrochloric acid (generally in the same number of moles as Li, Fe and $PO_4$) was ground and reacted in an agate mortar for two hours. At this time, pure water was added as needed by dripping to decrease the viscosity of the mixture. After that, the mixture was placed in a beaker and ultrasonic wave was irradiated on the mixture for 40 minutes to accelerate the reaction. Then, the reaction mixture was pulverized in a planetary ball mill for two hours. After addition of 1.1270 g of lithium hydroxide, the mixture was further pulverized in the planetary ball mill for one hour. After removing water from the pulverized mixture with an evaporator, the mixture was dried in a vacuum desiccator for one day to obtain calcination precursor.

When X-ray diffraction analysis of the calcination precursor was performed, iron chloride tetrahydrate was formed in addition to ferrous phosphate octahydrate and lithium phosphate. Also, formation of lithium chloride was suggested whereas no residual metal iron was observed. The illustrating of the result of X-ray diffraction analysis of the calcination precursor is omitted.

The calcination precursor was subjected to preliminary calcination at 400° C. in an atmosphere of 5% $H_2$ and 95% Ar for five hours. 0.2941 g of coal pitch (product of Adchemco Corp., softening point: 250° C.) was added to the preliminary calcined intermediate product, and the mixture was ground and then subjected to final calcination at 725° C. in an atmosphere of 5% $H_2$ and 95% Ar for 10 hours to obtain a target cathode material.

Figure 9:
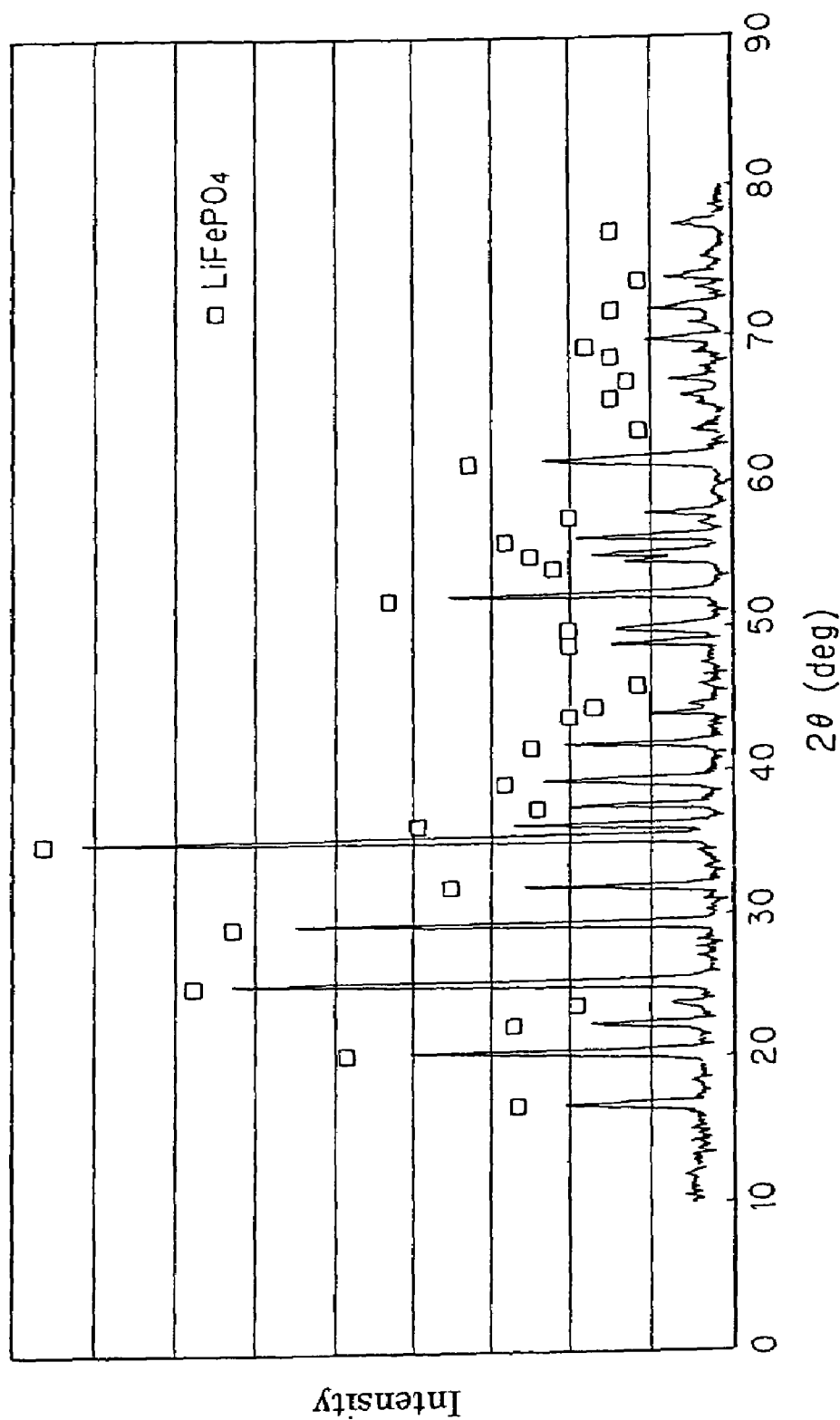
FIG. 9 is a graph showing the result of X-ray diffraction analysis of a cathode material obtained in Example 3.

X-ray diffraction analysis was performed on the cathode material. The result is shown in FIG. 9. The synthesized cathode material was identified as $LiFePO_4$ having an olivine-type crystal structure by the X-ray diffraction analysis. Also, according to the results of the X-ray diffraction analysis, the peak corresponding to metal iron almost disappeared in the cathode material after the calcination (FIG. 9). When the surface of the cathode material was observed under an electron microscope, aggregates (about 1 μm) of fine granular crystals with a diameter of 0.5 μm or smaller were observed. Variation in the size of the granular crystals and existence of needle crystals were not observed, which indicated that uniform crystal formation took place.

The result of elemental analysis of the cathode material is shown below.

<Result of elemental analysis> (molar ratio with respect to P)
Li:Fe:P=0.987:0.989:1
C 4.80% by weight (2) Fabrication of Secondary Battery:

The cathode material, acetylene black as a conductivity-imparting material [Denka Black (registered trademark), product of Denki Kagaku Kogyo K. K.; 50% pressed product] and unsintered PTFE (polytetrafluoroethylene) powder as a binder were mixed at a ratio, by weight, of 72.2:23.8:5 and ground. The mixture was rolled into a sheet with a thickness of 0.6 mm, and the sheet was punched out into discs with a diameter of 1.0 cm to form a pellet as a cathode.

A metal titanium screen and a metal nickel screen were welded as cathode and anode current collectors, respectively, to a coin-type battery case made of stainless steel (Model No. CR2032) by spot welding. The cathode and an anode made of a metal lithium foil were assembled in the battery case with a porous polyethylene separating membrane, Celgard 3501 (a product of Celgard K. K.) interposed between the cathode and the anode. The battery case was filled with a 1 M solution of $LiPF_6$ in a 1:1 mixed solvent of dimethyl carbonate and ethylene carbonate as an electrolyte solution, and then sealed to fabricate a coin-type lithium secondary battery. All the process of assembling the cathode and anode, separating membrane, and the electrolyte into a battery was performed in a dried argon-purged glove box.

Figure 10:
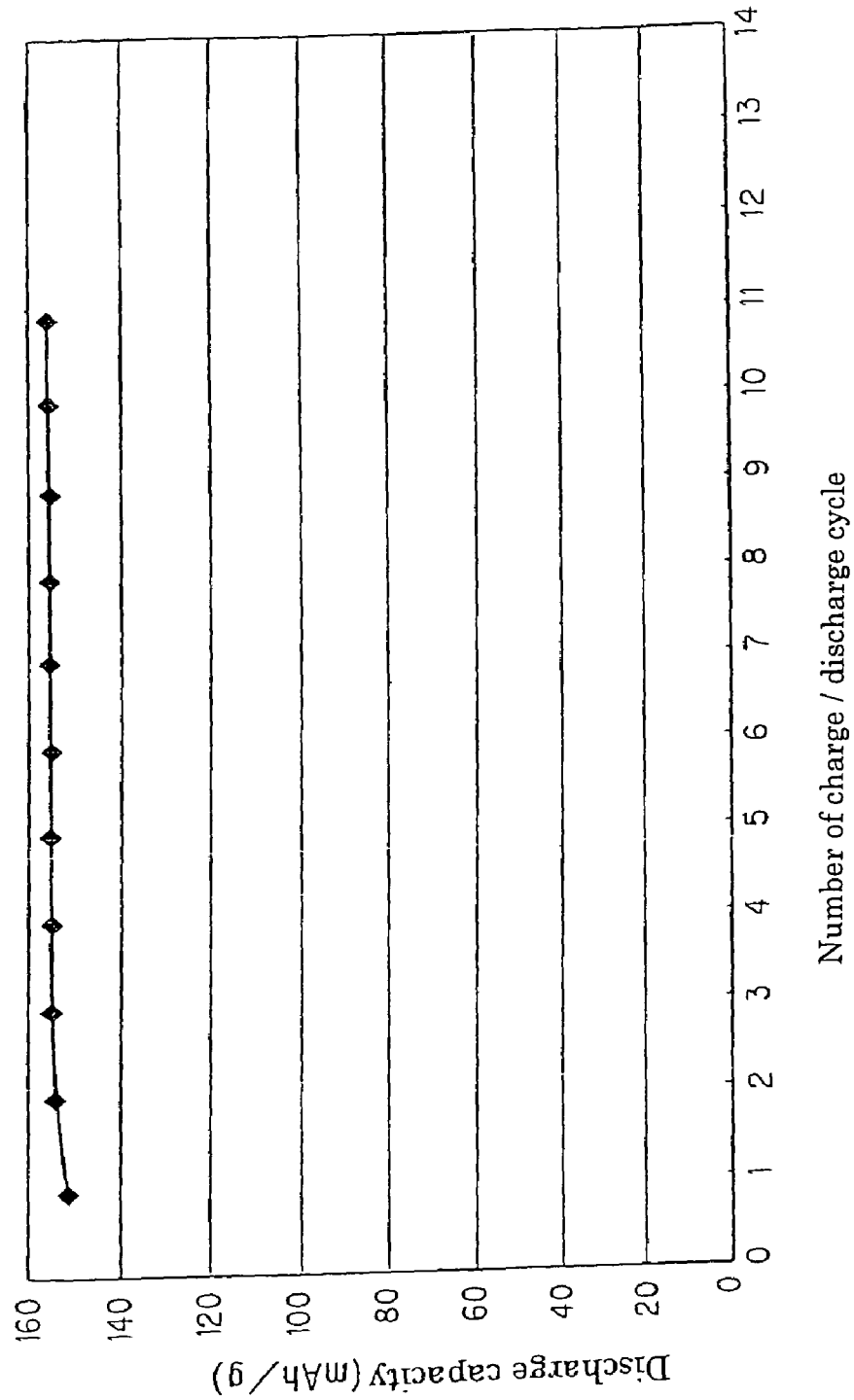
FIG. 10 is a graph showing the charge/discharge characteristics of a coin-type secondary battery obtained in Example 3.

The secondary battery with the cathode material produced as described above was alternately charged and discharged at a current density of 0.5 mA/cm² per apparent area of the cathode pellet in an operating voltage range of 3.0 V to 4.0 V under a constant current condition (one hour of zero-current period was provided at each switching between charging and discharging). The initial discharge capacities in the first to eleventh cycles were as shown in FIG. 10 (the initial discharge capacities were standardized based on the weight of the cathode active material in the product).

The maximum discharge capacity (value corrected with the carbon amount obtained by the elemental analysis) was 156.1 mAh/g.

EXAMPLE 4

(1) Preparation of Cathode Material:

A cathode material $LiFePO_4$ was synthesized by the following procedure.

A mixture of 1.5 g of iron powder [under 325 mesh (44 μm) (purity 99.9%): product of The Nilaco Corporation], 3.0967 g of 85% $H_3PO_4$ (product of Wako Pure Chemical Industries, Ltd.), and 3.3861 g of oxalic acid (generally in the same number of moles as Li, Fe and $PO_4$) was ground and reacted in an agate mortar for two hours. At this time, pure water was added as needed by dripping to decrease the viscosity of the mixture. After that, the mixture was placed in a beaker and ultrasonic wave was irradiated on the mixture for 30 minutes to accelerate the reaction. Then, the reaction mixture was pulverized in a planetary ball mill for two hours. After addition of 1.1270 g of lithium hydroxide, the mixture was further pulverized in the planetary ball mill for one hour. After removing water from the pulverized mixture with an evaporator, the mixture was dried in a vacuum desiccator for one day to obtain calcination precursor.

According to the result of the X-ray diffraction analysis of the calcination precursor, the peaks corresponding to ferrous phosphate octahydrate were not observed. Also, ferrous oxalate dihydrate ($FeC_2O_4 \cdot 2H_2O$) and lithium phosphate were formed whereas almost no metal iron remained. The illustrating of the result of X-ray diffraction analysis of the calcination precursor is omitted.

The calcination precursor was subjected to preliminary calcination at 400° C. in an atmosphere of 5% $H_2$ and 95% Ar for five hours. 0.2941 g of a coal pitch (product of Adchemco Corp., softening point: 250° C.) was added to the preliminary calcined intermediate product, and the mixture was ground and then subjected to final calcination at 725° C. in an atmosphere of 5% $H_2$ and 95% Ar for 10 hours to obtain a target cathode material.

Figure 11:
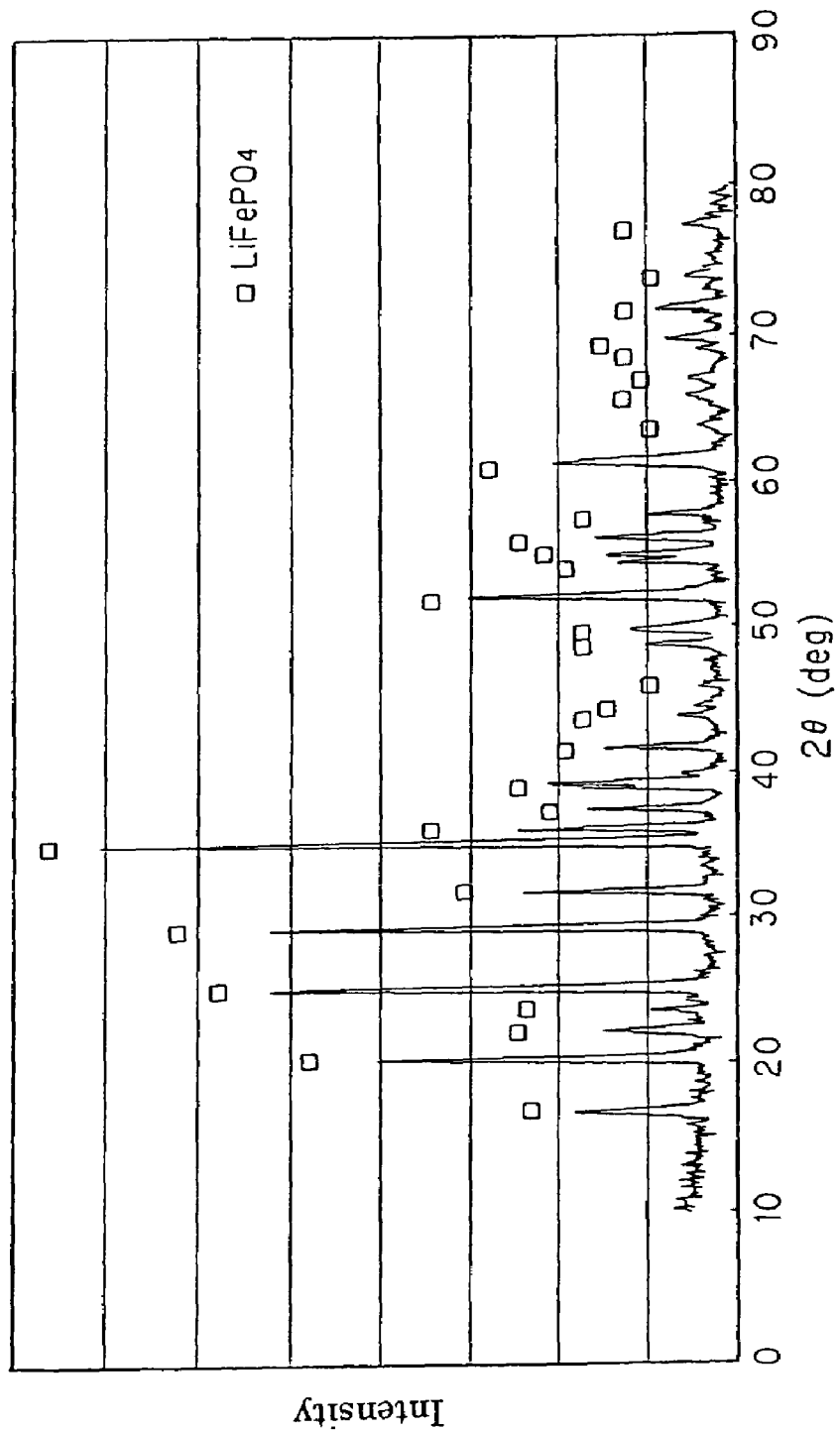
FIG. 11 is a graph showing the result of X-ray diffraction analysis of a cathode material obtained in Example 4.

X-ray diffraction analysis was performed on the cathode material. The result is shown in FIG. 11. The synthesized cathode material was identified as LiFePO$_4$ having an olivine-type crystal structure by the X-ray diffraction analysis.

Also, according to the results of the X-ray diffraction analysis, the peak corresponding to metal iron almost disappeared in the cathode material after the calcination (FIG. 11). When the surface of the cathode material was observed under an electron microscope, aggregates (about 1 µm) of fine granular crystals with a diameter of 0.5 µm or smaller were observed. Variation in the size of the granular crystals and existence of needle crystals were not observed, which indicated that uniform crystal formation took place.

The result of elemental analysis of the cathode material is shown below.

Figure 12:
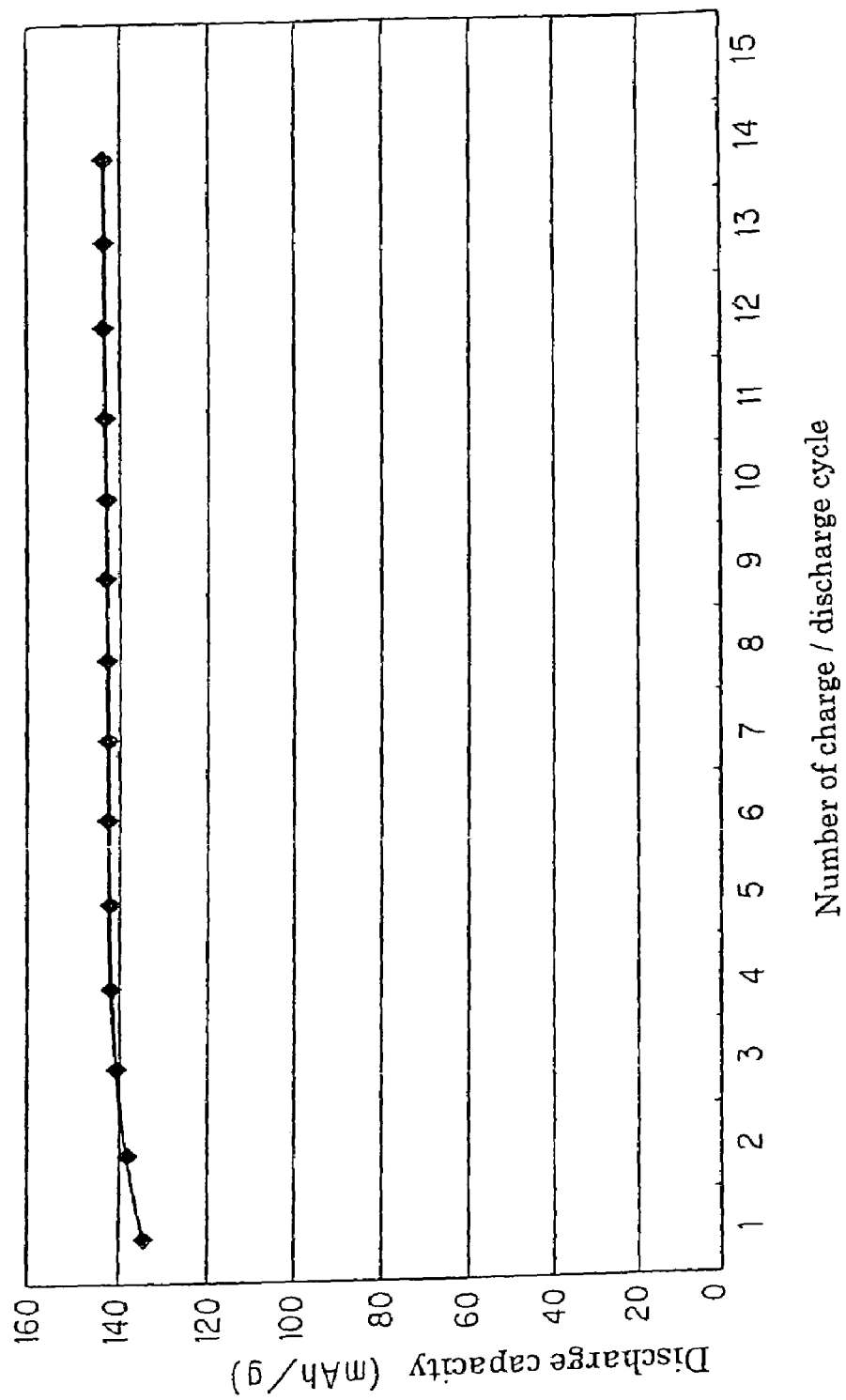
FIG. 12 is a graph showing the charge/discharge characteristics of a coin-type secondary battery obtained in Example 4.

<Result of elemental analysis> (molar ratio with respect to P)
Li:Fe:P=0.982:0.989:1
C 4.85% by weight (2) Fabrication of Secondary Battery:

Using the cathode material, a secondary battery was fabricated in the same manner as in Example 3. The secondary was alternately charged and discharged at a current density of 0.5 mA/cm$^2$ per apparent area of the cathode pellet in an operating voltage range of 3.0 V to 4.0 V under a constant current condition (one hour of zero-current period was provided at each switching between charging and discharging). The initial discharge capacities in the first to eleventh cycles were as shown in FIG. 12 (the initial discharge capacities were standardized based on the weight of the cathode active material in the product).

The maximum discharge capacity (value corrected with the carbon amount obtained by the elemental analysis) was 144.7 mAh/g.

As shown in Example 3 and 4, the cathode materials using hydrochloric acid or oxalic acid generally in the same number of moles as iron, lithium and phosphate ions in the ingredients exhibited discharge capacities of about 156 mAh/g and about 143 mAh/g, respectively. The former (Example 3, using hydrochloric acid) had a capacity equal to or higher than that of conductive carbon deposited LiFePO$_4$ obtained from conventionally used ingredients. The latter (Example 4, using oxalic acid) had a capacity slightly lower than that of the cathode material produced without using an acid (Example 2).

It is considered that the synthesis reaction from the calcination precursor synthesized using hydrochloric acid or oxalic acid takes each different reaction process to lithium iron phosphate during the calcinations, respectively. The cathode material derived from a calcination precursor synthesized using hydrochloric acid (Example 3) exhibited a discharge capacity of 156 m Ah/g as shown in FIG. 10. This indicates that lithium iron phosphate can be obtained with high efficiency from the calcination precursor synthesized from iron chloride, lithium chloride and phosphoric acid by calcination. On the other hand, the cathode material derived from a calcination precursor synthesized using oxalic acid (Example 4) did not exhibited so high a discharge capacity as the cathode material using hydrochloric acid, but the effect of promoting the dissolution of iron was observed.

EXAMPLE 5

A cathode material LiFePO$_4$ was synthesized by the following procedure.

100 ml of pure water was added to a stoichiometric mixture of iron powder, 6.0 g [product of Wako Pure Chemical Industries, Ltd.; 325 mesh (under 44 µm, purity: 99.9% or higher)] and phosphorous pentoxide, 12.3868 g (product of Wako Pure Chemical Industries, Ltd.), and the resulting mixture was charged in a glass Erlenmeyer Flask equipped with a water-cooled condenser and refluxed with a hot stirrer at 100° C. in an atmosphere of N$_2$ for three days (this method will be hereinafter referred to as "reflux method"). 4.508 g of lithium hydroxide was added to the content after the refluxing, and the mixture was well stirred. After removing water from the mixture with an evaporator, the mixture was dried in a vacuum desiccator for one day to obtain calcination precursor.

According to the results of the X-ray diffraction analysis on the calcination precursor, ferrous phosphate octahydrate and lithium phosphate were formed whereas the diffraction peaks corresponding to metal iron were not observed. The illustrating of the result of X-ray diffraction analysis of the calcination precursor is omitted.

The calcination precursor was subjected to preliminary calcination at 400° C. in an atmosphere of 5% H$_2$ and 95% Ar for five hours. 1.1764 g of a coal pitch (product of Adchemco Corp., softening point: 250° C.) was added to the preliminary calcined intermediate product, and the mixture was ground and then subjected to final calcination at 725° C. in an atmosphere of 5% H$_2$ and 95% Ar for 10 hours to obtain a target cathode material.

Figure 13:
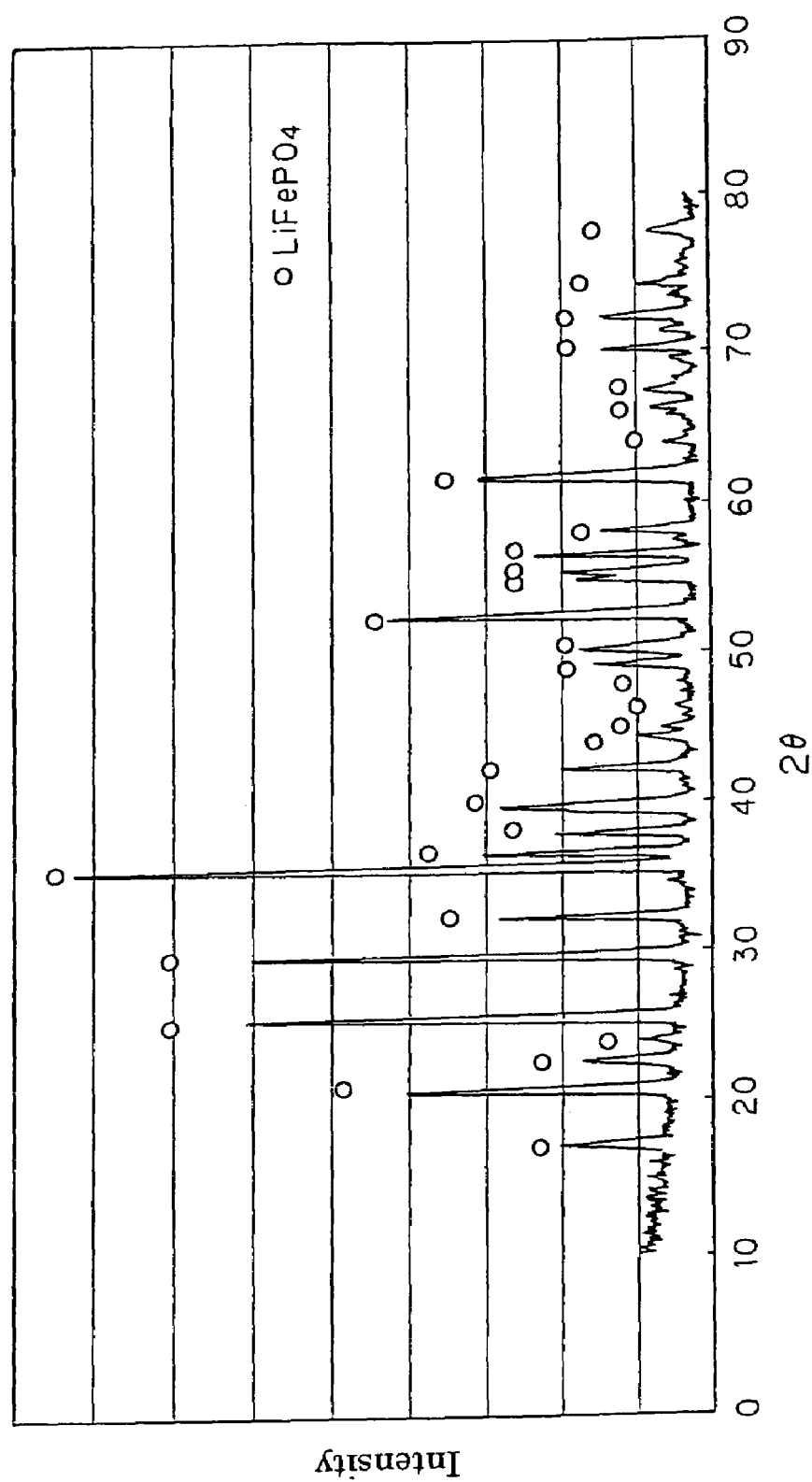
FIG. 13 is a graph showing the result of X-ray diffraction analysis of a cathode material obtained in Example 5.

X-ray diffraction analysis was performed on the cathode material. The result is shown in FIG. 13. The synthesized cathode material was identified as LiFePO$_4$ having an olivine-type crystal structure by the X-ray diffraction analysis, and the peaks corresponding to residual metal iron crystal were not observed.

The result of elemental analysis of the cathode material is shown below.

Figure 14:
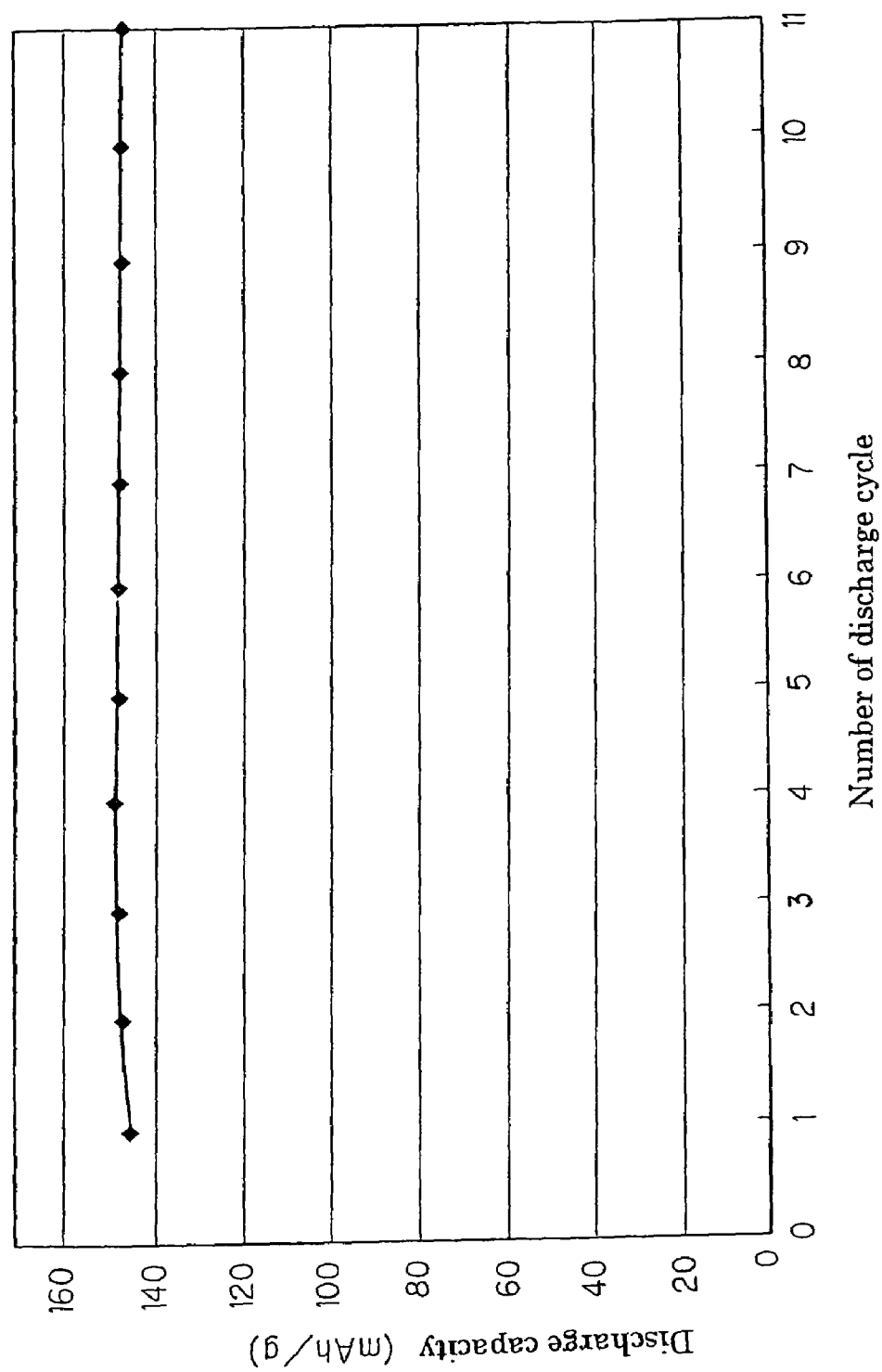
FIG. 14 is a graph showing the charge/discharge characteristics of a coin-type secondary battery obtained in Example 5.

<Result of elemental analysis> (molar ratio with respect to P)
Li:Fe:P=0.997:1.002:1
C 3.73% by weight (2) Fabrication of Secondary Battery:

Using the cathode material, a secondary battery was fabricated in the same manner as in Example 3. The secondary was alternately charged and discharged at a current density of 0.5 mA/cm$^2$ per apparent area of the cathode pellet in an operating voltage range of 3.0 V to 4.0 V under a constant current condition (one hour of zero-current period was provided at each switching between charging and discharging). The initial discharge capacities in the first to eleventh cycles were as shown in FIG. 14 (the initial discharge capacities were standardized based on the weight of the cathode active material in the product).

The maximum discharge capacity (value corrected with the carbon amount obtained by the elemental analysis) was 148.6 mAh/g.

This indicates that it is possible by a reflux method to synthesize a calcination precursor equivalent to the calcination precursor obtained by grinding and reacting the ingredients in a planetary ball mill, and a high-performance cathode material can be obtained by calcination of the calcination precursor.

INDUSTRIAL APPLICABILITY

The cathode material produced by the method of the present invention can be used as a cathode material for a secondary battery such as a metal lithium battery, lithium ion battery and lithium polymer battery. The secondary battery using the cathode material is promising to be used as a high current power source for driving a movable body such as a hybrid electric vehicle or for a cellular phone.

The invention claimed is:

1. A method for producing a cathode material for a secondary battery, comprising the steps of mixing a compound which releases phosphate ions in a solution with water and metal iron to dissolve the metal iron, adding lithium carbonate, lithium hydroxide or a hydrate thereof to the solution, and calcining the reaction mixture to synthesize $LiFePO_4$.

2. The method for producing a cathode material for a secondary battery according to claim 1, wherein the calcining step has a first stage in a temperature range of room temperature to 300 through 450° C. and a second stage in a temperature range of room temperature to the calcination completion temperature, and the second stage of the calcining step is carried out after addition of a substance from which conductive carbon is formed by pyrolysis to the product of the first stage of the calcining step.

3. The method for producing a cathode material for a secondary battery according to claim 2, wherein the calcination is carried out after conductive carbon is added to the ingredients before the first stage of the calcining step.

4. The method for producing a cathode material for a secondary battery according to claim 2 or 3, wherein the substance from which conductive carbon is formed by pyrolysis is a bitumen.

5. The method for producing a cathode material for a secondary battery according to claim 4, wherein the bitumen is a coal pitch which has a softening point in a range of 80 to 350° C. and a pyrolytic weight-loss initiation temperature in a range of 350 to 450° C. and from which conductive carbon is formed by pyrolysis and calcination at a temperature of 500 to 800° C.

6. The method for producing a cathode material for a secondary battery according to claim 2 or 3, wherein the substance from which conductive carbon is formed by pyrolysis is a saccharide.

7. The method for producing a cathode material for a secondary battery according to claim 6, wherein the saccharide is one which is decomposed at a temperature in a range of 250° C. or higher to lower than 500° C. and gets at least partially melted once in the course of heating from 150° C. up to the temperature at which it is decomposed and from which conductive carbon is formed by pyrolysis and calcination at a temperature not lower than 500° C. and not higher than 800° C.

8. The method for producing a cathode material for a secondary battery according to any one of claims 1 to 3, wherein one or more selected from the group consisting of hydrogen, water and water vapor is added at least after the temperature is raised to 500° C. or higher during the calcining step.

* * * * *